(12) United States Patent
McMurtrey et al.

(10) Patent No.: US 11,332,179 B2
(45) Date of Patent: May 17, 2022

(54) CART

(71) Applicant: Unarco Industries LLC, Wagoner, OK (US)

(72) Inventors: Wesley McMurtrey, Bixby, OK (US); William Timothy Harrison, Muskogee, OK (US)

(73) Assignee: Unarco Industries LLC, Wagoner, OK (US)

( * ) Notice: Subject to any disclaimer, the term of this patent is extended or adjusted under 35 U.S.C. 154(b) by 178 days.

(21) Appl. No.: 16/736,801

(22) Filed: Jan. 7, 2020

(65) Prior Publication Data
US 2020/0216105 A1 Jul. 9, 2020

Related U.S. Application Data

(60) Provisional application No. 62/789,581, filed on Jan. 8, 2019.

(51) Int. Cl.
| | |
|---|---|
| *B62B 5/06* | (2006.01) |
| *B62B 3/18* | (2006.01) |
| *B62B 5/00* | (2006.01) |
| *B62B 3/00* | (2006.01) |
| *B62B 5/08* | (2006.01) |

(52) U.S. Cl.
CPC .......... *B62B 5/0006* (2013.01); *B62B 3/002* (2013.01); *B62B 3/18* (2013.01); *B62B 5/06* (2013.01); *B62B 5/082* (2013.01)

(58) Field of Classification Search
CPC ....... B62B 5/0006; B62B 5/0009; B62B 5/06; B62B 3/002; B62B 3/18; B62B 3/14; B62B 5/82
See application file for complete search history.

(56) References Cited

U.S. PATENT DOCUMENTS

| | | | |
|---|---|---|---|
| 2,155,896 A | 4/1939 | Goldman | |
| 2,662,775 A | 12/1953 | Goldman | |
| 2,769,645 A | 11/1956 | Young | |
| 4,055,362 A * | 10/1977 | Becker, III | .......... A47B 95/043 |
| | | | 293/121 |
| 5,131,669 A * | 7/1992 | Kinnamon | ............ B62B 5/0006 |
| | | | 280/33.992 |

(Continued)

OTHER PUBLICATIONS

Manufacturing Shopping Trolleys, https://www.youtube.com/watch?v=u5hwY1s0O0M, uploaded according to YouTube Apr. 12, 2008.

(Continued)

*Primary Examiner* — John D Walters
(74) *Attorney, Agent, or Firm* — Arnold & Porter Kaye Scholer

(57) ABSTRACT

A shopping cart includes a frame having a chassis portion and a handle portion extending upward from the chassis portion, a pair of front casters and a pair of rear casters mounted on the frame, and a basket connected to the frame and supported by the frame, the basket defining a chamber for holding articles, where the frame further includes a support structure connected to the chassis and the basket and supporting a portion of the basket. The shopping cart may include a number of wear resistance features that decrease the wear on the cart and extend the life of the shopping cart.

19 Claims, 29 Drawing Sheets

(56) References Cited

U.S. PATENT DOCUMENTS

| | | | | |
|---|---|---|---|---|
| 5,340,133 | A * | 8/1994 | Trubiano | B62B 5/0006 |
| | | | | 24/460 |
| 7,090,230 | B2 | 8/2006 | O'Quin | |
| 7,121,562 | B2 * | 10/2006 | O'Quin | B62B 5/0006 |
| | | | | 280/33.992 |
| 7,673,886 | B2 * | 3/2010 | Ondrasik | B62B 3/146 |
| | | | | 280/33.991 |
| 7,698,780 | B2 * | 4/2010 | Yan | B60B 33/0057 |
| | | | | 16/35 R |
| 8,875,351 | B1 * | 11/2014 | Williams | B62B 5/069 |
| | | | | 16/436 |
| 9,302,692 | B2 * | 4/2016 | Smith | B62B 3/14 |
| 9,815,486 | B2 * | 11/2017 | McMurtrey | B62B 5/082 |
| 2010/0289234 | A1 * | 11/2010 | Sonnendorfer | G09F 3/20 |
| | | | | 280/33.992 |
| 2013/0307239 | A1 | 11/2013 | Smith et al. | |
| 2014/0159327 | A1 | 6/2014 | Smith et al. | |

OTHER PUBLICATIONS http://en.wikipedia.org/wiki/Shopping_cart.
Smithsonian's History Explorer, History of the Shopping Cart, currently found at http://amhistory.si.edu/thinkfinity/podcast/shoppingcart.m4a.

* cited by examiner

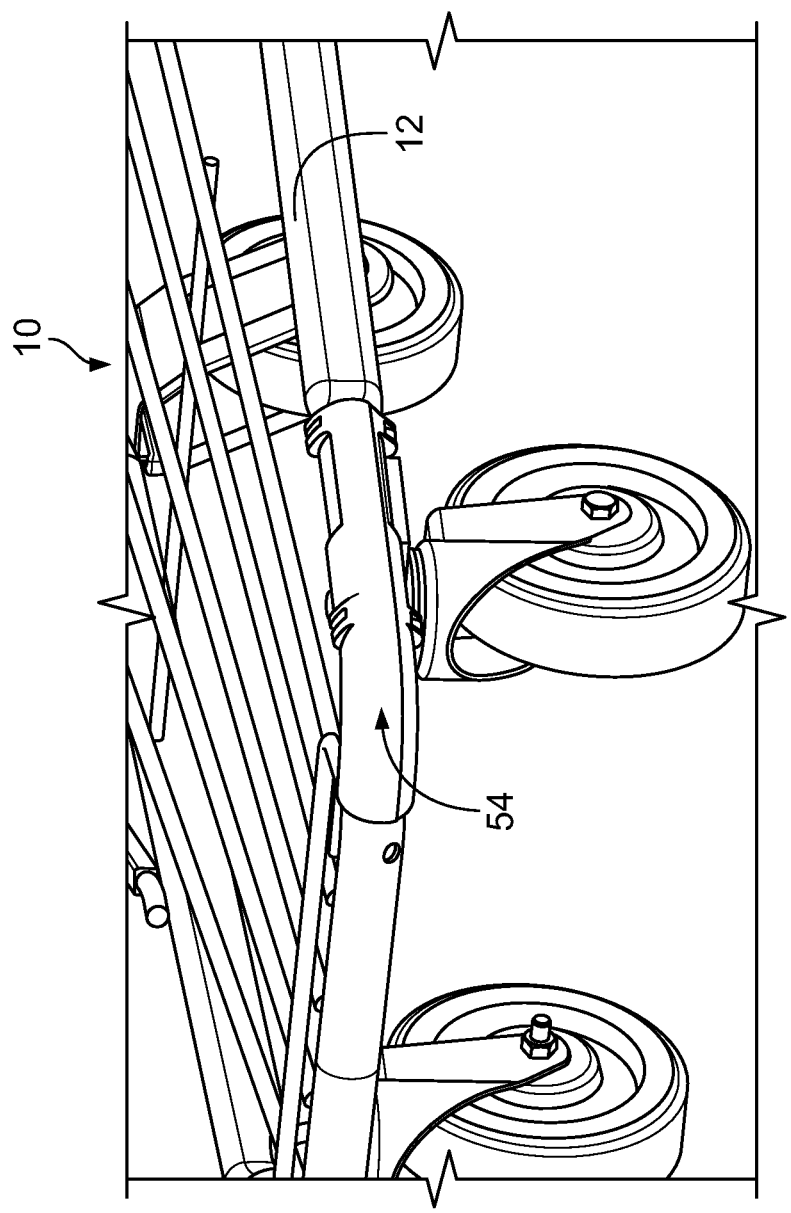

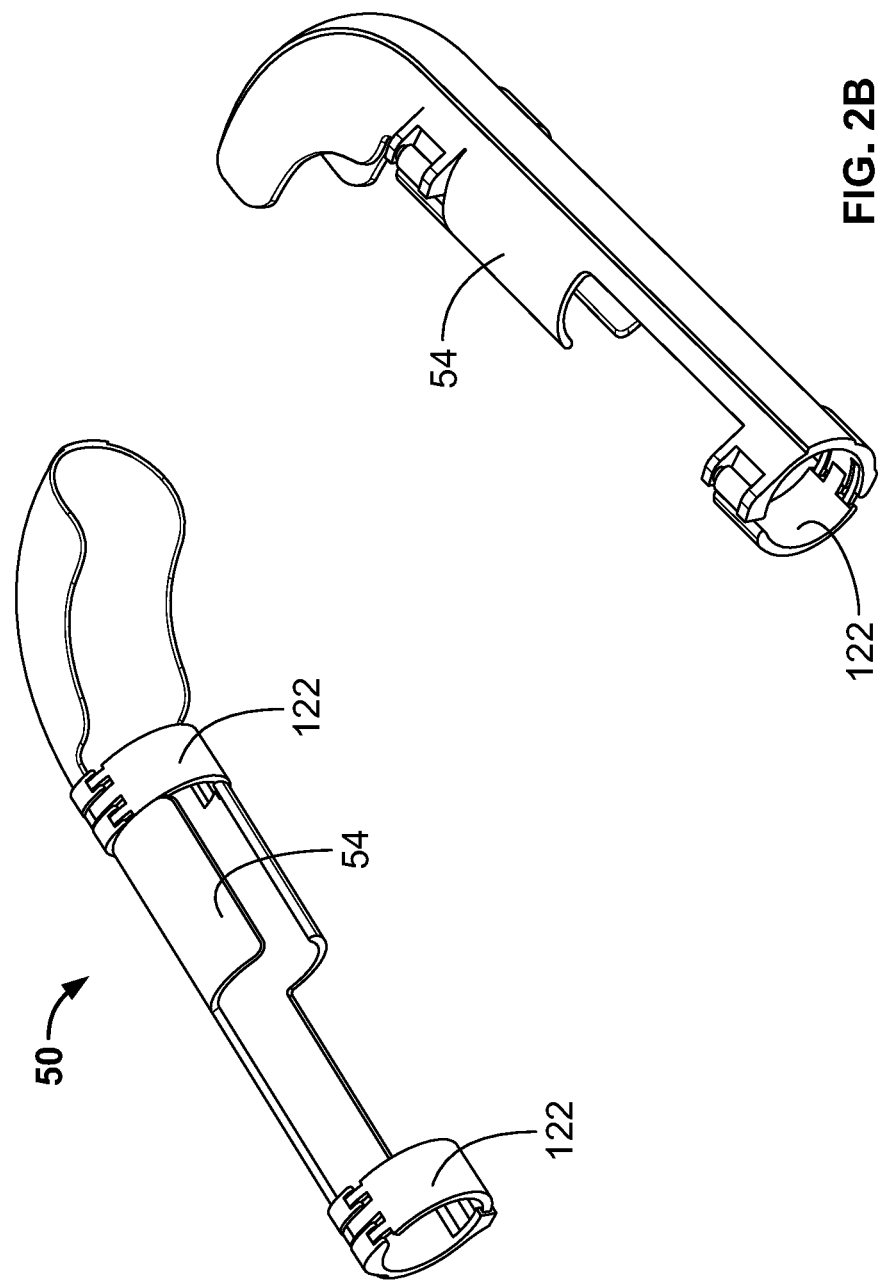

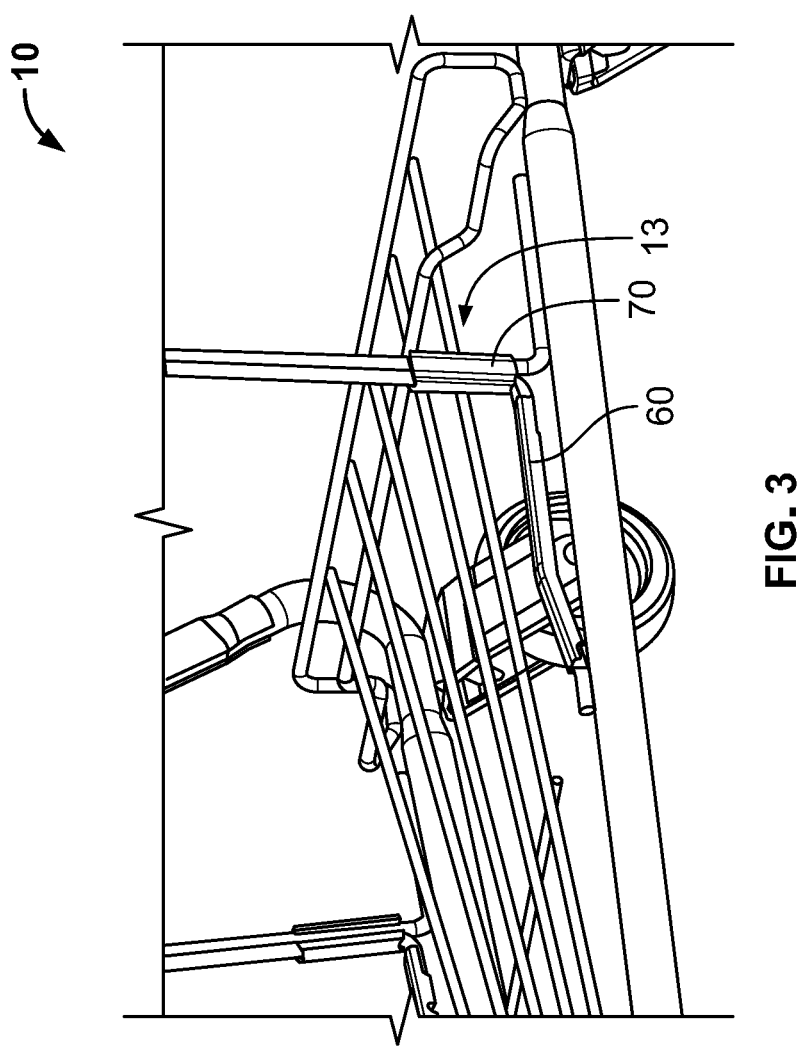

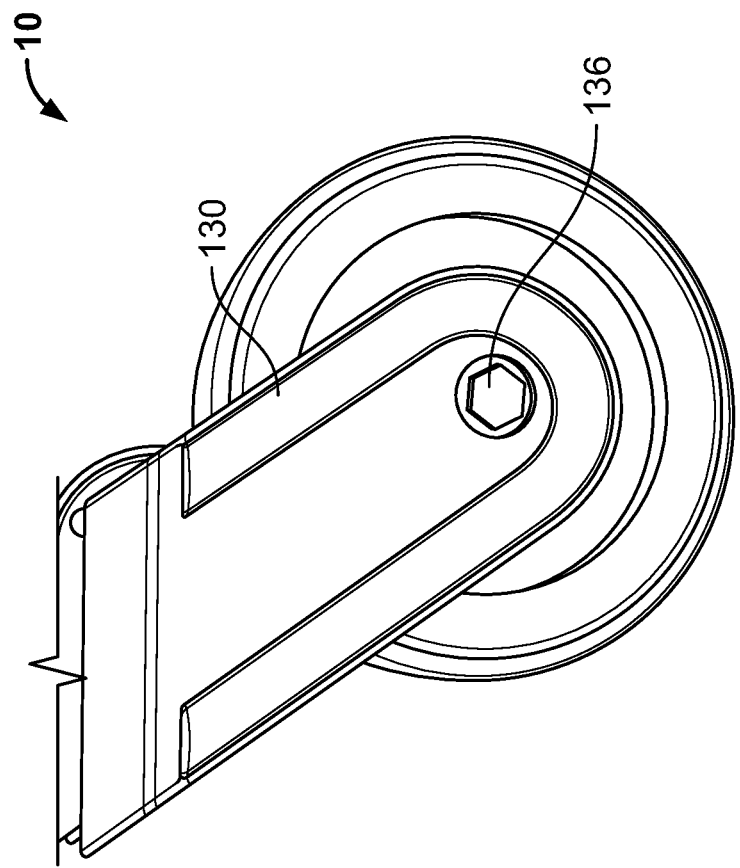

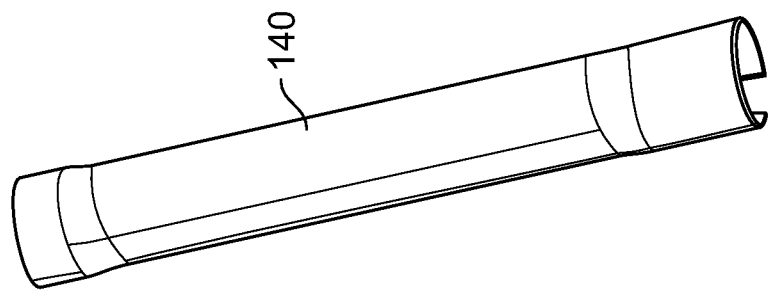
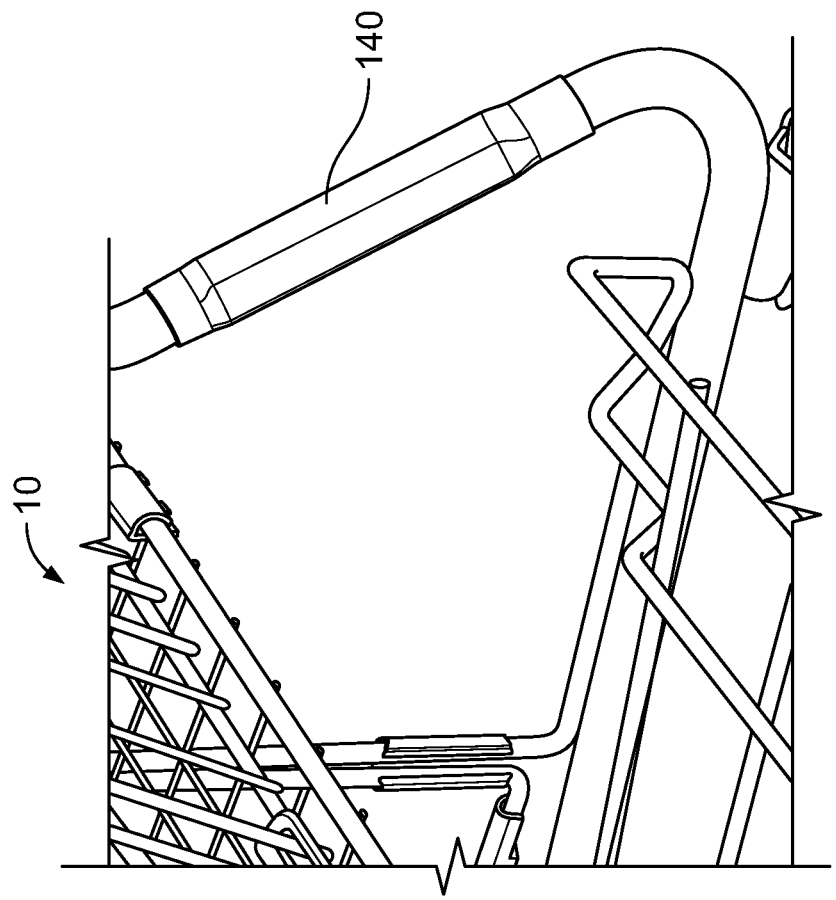

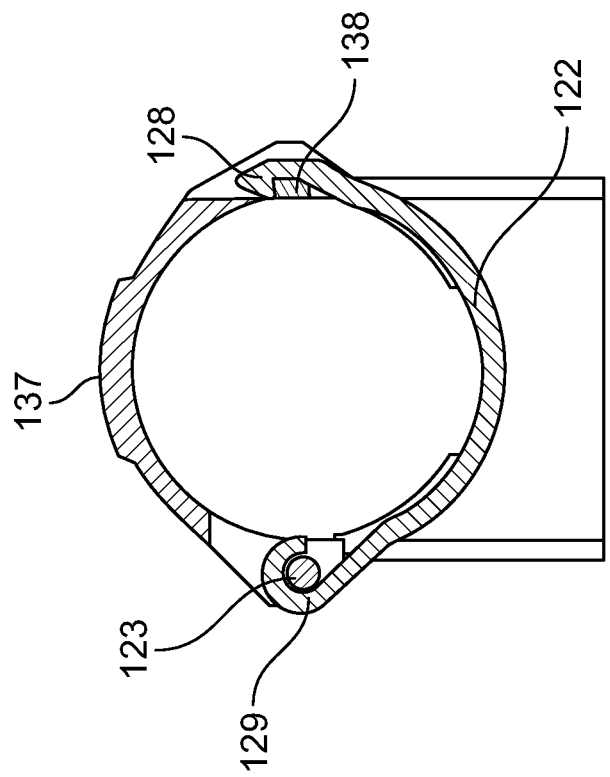
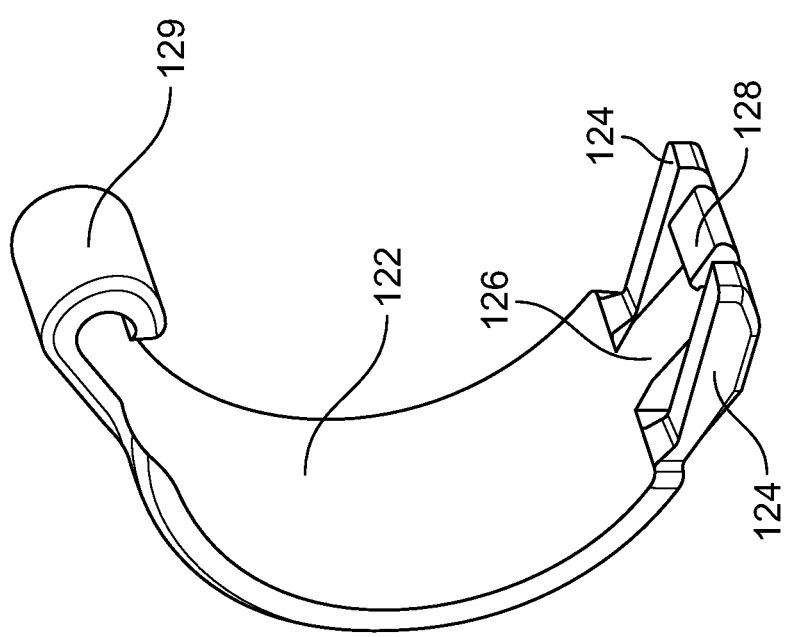
FIG. 14B
FIG. 14A

CART

CROSS REFERENCE TO RELATED APPLICATION

This application claims benefit to U.S. Provisional Application No. 62/789,581 filed on Jan. 8, 2019. The above application is incorporated herein by reference.

FIELD OF THE INVENTION

This disclosure relates to nestable shopping carts for grocery stores and the like and more specifically relates to shopping carts having certain features to reduce wear and abrasion to the shopping carts.

BACKGROUND

History and lore teach that the shopping cart was invented by Oklahoman Sylvan Goldman, for his grocery store business, the one that became over time Unarco Industries, LLC, the assignee of this disclosure. At present, the American-market, adult, full-size, wire-made shopping cart has a distinctive construction of a frame, casters, basket, hinged back gate and child seat. For more historical information, see the following: Unarco Company History, Unarco Industries LLC, currently found at http://www.unarco.com/history.html; and for more allegedly historically accurate information, Shopping Cart, currently found at http://en.wikipedia.org/wiki/Shopping_cart; Smithsonian's History Explorer, History of the Shopping Cart, currently found at http://amhistory.si.edu/thinkfinity/podcast/shoppingcart.m4a. See as well the following patents and patent publications: U.S. Pat. No. 2,155,896, inventor Sylvan Goldman (original shopping cart); U.S. Pat. No. 2,662,775, inventor same; and U.S. Pat. No. 2,769,645, inventor same (folding child seat with hinged back gate). For more current information, see U.S. Pat. No. 7,090,230 issued Aug. 15, 2006, inventor O'Quin, assignee Unarco; U.S. Patent Publication No. US 2014/0159327 published Jun. 12, 2014, on a Shopping Cart, inventors Smith and McMurtrey, assignee Unarco, especially at FIGS. 2-3; U.S. Patent Publication No. US 2013/0307239 published Nov. 21, 2013, on a Shopping Cart and Method of Assembling Same, inventors Smith and McMurtrey, assignee Unarco, especially at its background; and "Manufacturing Shopping Trolleys," https://www.youtube.com/watch?v=u5hwY1s0O0M, uploaded according to YouTube Apr. 12, 2008.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

General aspects of the present disclosure relate to a shopping cart that includes a frame having a chassis portion and a handle portion extending upward from the chassis portion, a pair of front casters and a pair of rear casters mounted on the frame, and a basket connected to the frame and supported by the frame, the basket defining a chamber for holding articles, where the frame further includes a support structure connected to the chassis and the basket and supporting a portion of the basket. The shopping cart may include a number of wear resistance features which may decrease the wear on the cart and extend the life of the shopping cart.

According to another embodiment disclosed herein, an abrasion resistant shopping cart may include a frame, a chassis portion, a plurality of casters wherein the plurality of casters are mounted to the chassis, a handle extending upward from the chassis portion, a basket connected to the frame, and a bumper configured to provide wear protection that may include at least one retention clip. In some examples, the basket may further include a front wall, a rear gate, a plurality of side walls extending between the front wall and rear gate, and a floor. In other examples, the rear gate may be configured as a swinging gate. In yet other examples, the cart may be configured to nest with a second cart. In another example, the cart may further include an integrated nest stop and caster lift guard configured to reduce damage to the cart from nesting.

In other examples, the bumper may be selected from the group consisting of a frame nose bumper, a forward handle guard, a rear handle guard, a corner bumper wherein the corner bumper may include at least two wings extending from an inner wall of the corner bumper, a nose guard, a side guard, a front guard, a rear upright guard, a basket end rim bumper, a gate nesting bumper, and a unified horn cover.

In still other examples, the bumper may include a hinge pin configured to engage a hinge on the retention clip, a first finger guide, a second finger guide, and a locking finger guide. In another example, the retention clip may further include a first finger, a second finger, and a locking finger, wherein the retention clip pivotally rotates on the hinge pin, wherein the first and the second fingers are configured to engage the first and the second finger guides, and wherein the locking finger is configured to releasably engage the locking finger guide. In certain examples, the retention clip may further include a clip on a tip of the locking finger configured to engage a projection in the locking finger guide. In another example, the bumper may be configured to engage either side of the cart, or may be configured to engage a bottom and a top of the cart. In yet other examples, the shopping cart may also include a plurality of unified horn covers configured to engage the plurality of casters.

According to yet another embodiment disclosed herein, an abrasion resistant shopping cart may include a frame, a chassis portion, a plurality of casters wherein the plurality of casters are mounted to the chassis, a handle extending upward from the chassis portion, a basket connected to the frame, wherein the basket further includes a front wall, a swinging rear gate, a plurality of side walls extending between the front wall and rear gate, and a floor, a gate nesting bumper configured to engage the rear gate, and a universal cart bumper including at least one retention clip configured to secure the universal cart bumper to the cart.

In some examples, the cart may be configured to nest with a second cart, and the gate nesting bumper may be further configured to reduce wear caused by the nesting of carts. In other examples, the gate nesting bumper may further include a front piece that may include a hollow portion, a back piece, a spacer, and an opening configured to permit attachment to the gate. In yet other examples, the gate nesting bumper may further include a first and a second socket that may be configured to engage a mechanical fastener, and the gate nesting bumper may be attached to the gate by the mechanical fastener.

In some examples, the cart bumper may further include a hinge pin configured to engage a hinge on the retention clip, a first and a second finger guide, and a locking finger guide.

In other examples, the retention clip may further include a first finger and a second finger, and a locking finger, and the retention clip may pivotally rotate on the hinge pin, and the first and the second fingers may be configured to engage the first and the second finger guides, and the locking finger may be configured to releasably engage the locking finger guide. In still other examples, the retention clip may further include a clip on a tip of the locking finger configured to engage a projection in the locking finger guide. In another example, the universal cart bumper may be configured to engage either side of the cart, or a bottom and a top of the cart.

In certain embodiments disclosed herein, an abrasion resistance guard for a shopping cart may include a universal bumper configured to engage a left and right side of a shopping cart, or a bottom and a top portion of the shopping cart, and a retention clip. In certain examples, the universal bumper may further include a hinge pin configured to engage a hinge on the retention clip, a first finger guide, a second finger guide, and a locking finger guide. In other examples, the retention clip may further include a first finger, a second finger, and a locking finger. In some examples, the retention clip may pivotally rotate on the hinge pin, the first and the second fingers may be configured to engage the first and the second finger guides, the locking finger may be configured to engage the locking finger guide, and the retention clip may further include a clip on a tip of the locking finger configured to engage a projection in the locking finger guide.

These and various other features will be described more fully herein.

BRIEF DESCRIPTION OF THE DRAWINGS

To allow for a more full understanding of the present disclosure, it will now be described by way of example, with reference to the accompanying drawings in which:

FIG. 2A is a front perspective view of a frame nose bumper of a shopping cart according to aspects of the present disclosure;

FIG. 2B illustrates the frame nose bumpers with retention clips of a shopping cart according to aspects of the present disclosure;

FIG. 3 is a perspective view of an integrated caster lift guard/nest stop guard of a shopping cart according to aspects of the present disclosure;

FIG. 6A depicts a side view of a unified horn cover of a shopping cart according to aspects of the present disclosure;

FIG. 7A depicts a perspective view of a rear upright guard of a shopping cart according to aspects of the present disclosure;

FIG. 7B depicts a perspective view of a rear upright guard of a shopping cart according to aspects of the present disclosure;

FIG. 14A depicts a perspective view of a retention clip according to aspects of the present disclosure;

FIG. 14B depicts a side view of a retention clip engaged with a bumper in a closed and locked configuration according to aspects of the present disclosure.

Figure 1A:
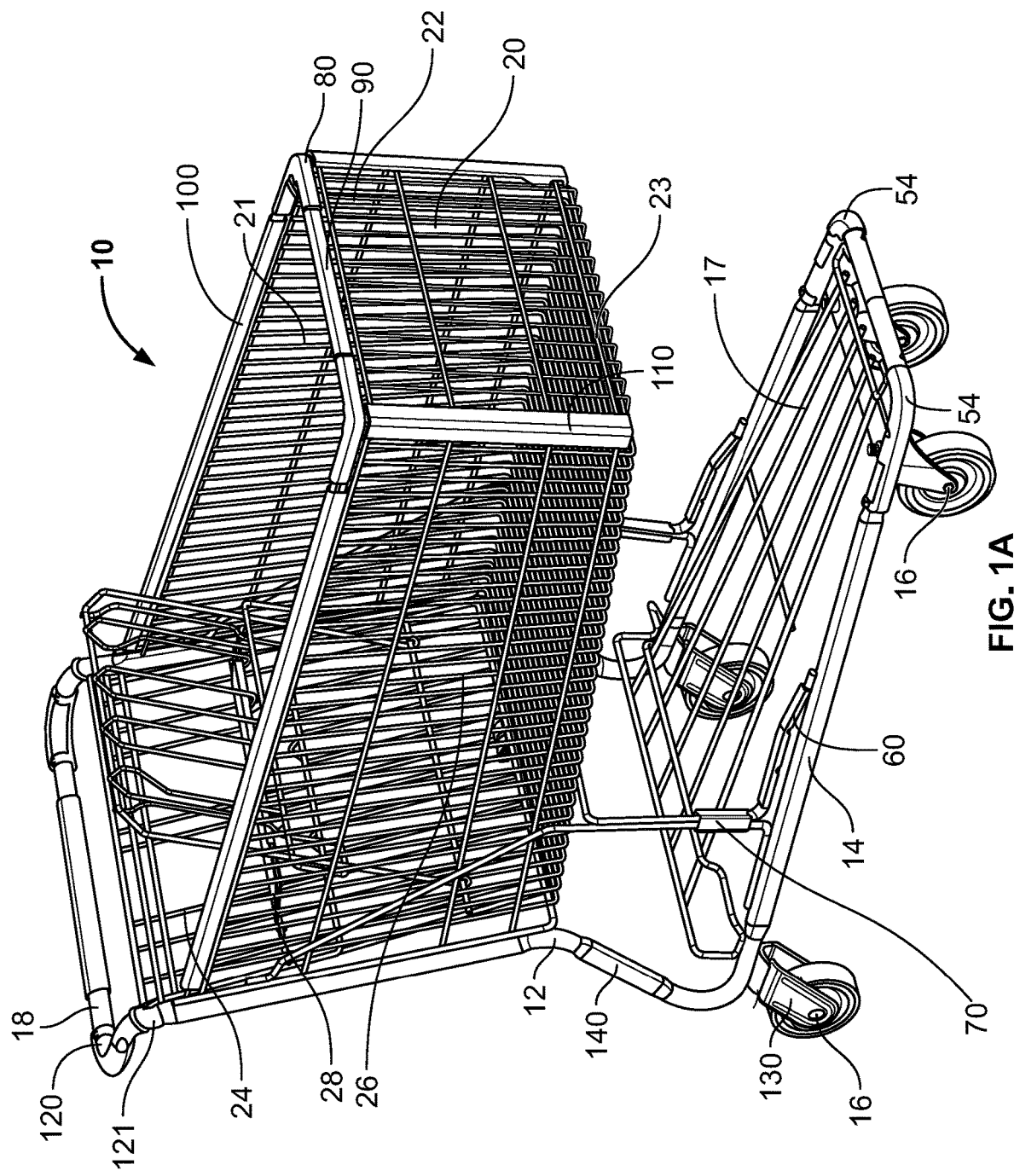
FIG. 1A is a perspective view of one embodiment of a shopping cart according to aspects of the present disclosure.
Figure 1C:
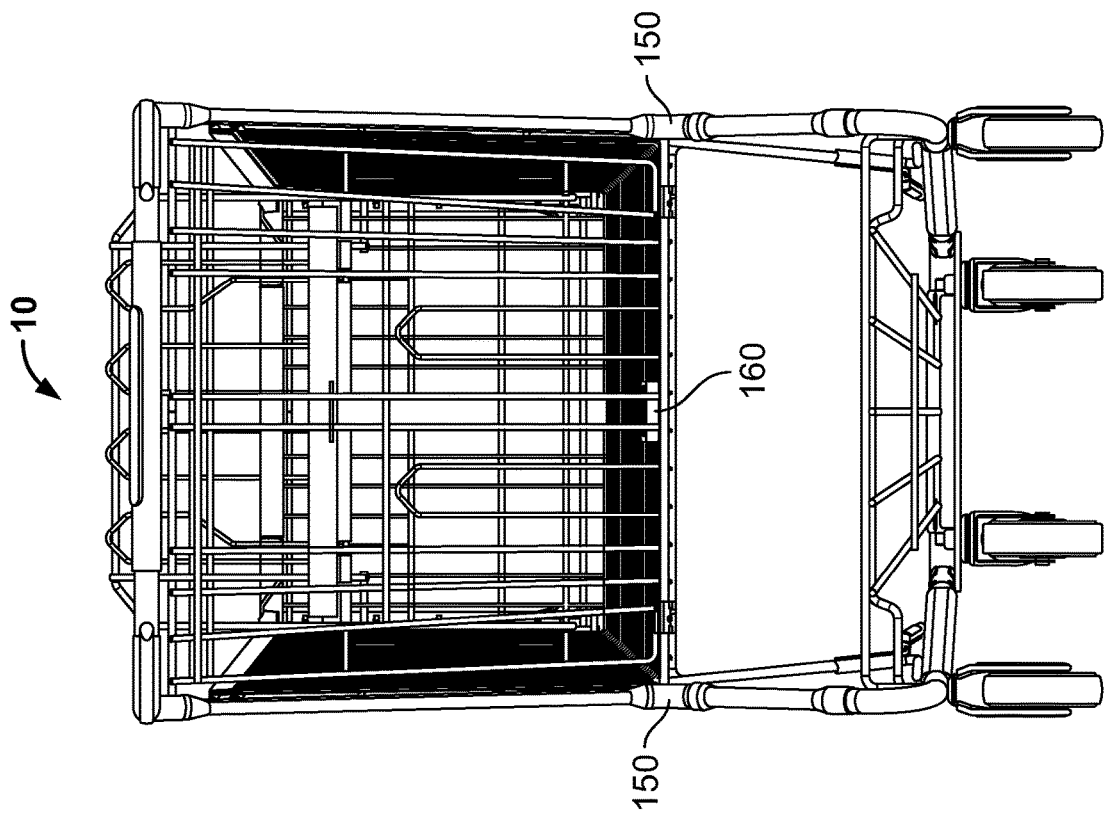
FIG. 1C is a rear view of the shopping cart of FIG. 1A.
Figure 1B:
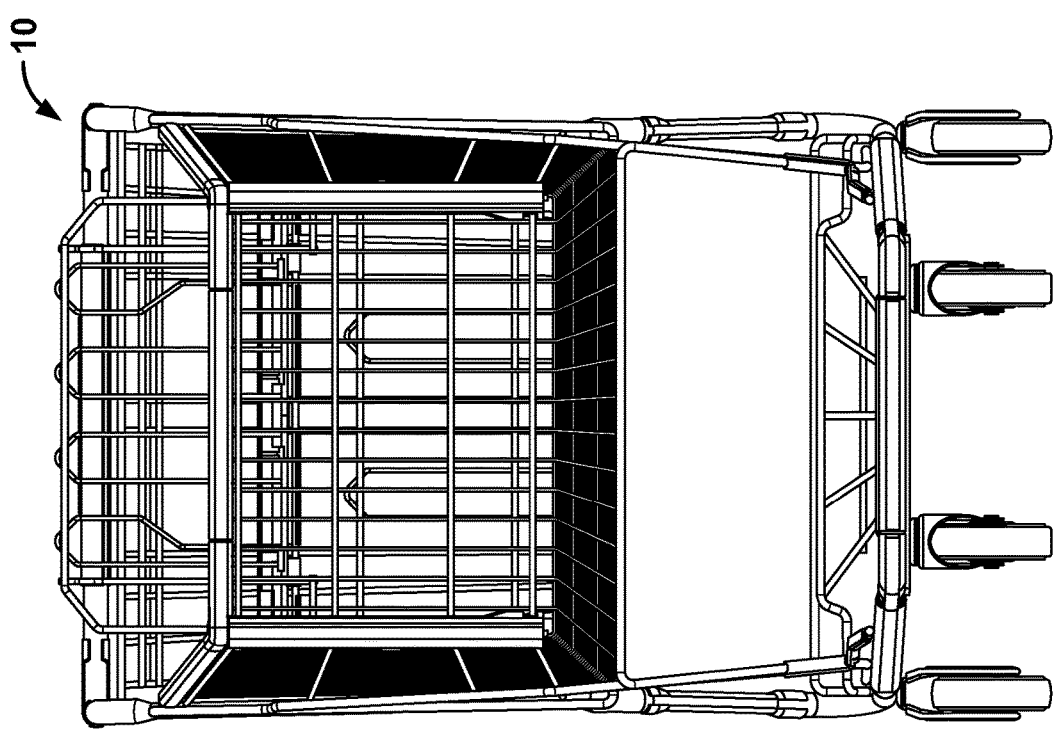
FIG. 1B is a front view of the shopping cart of FIG. 1A.
Figure 1D:
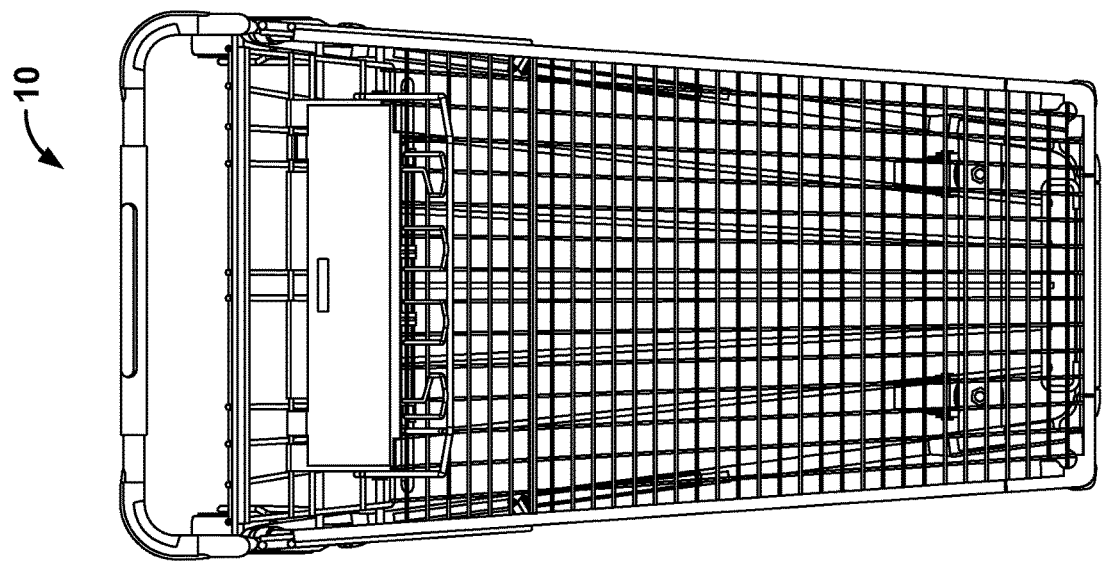
FIG. 1D is a top view of the shopping cart of FIG. 1A.
Figure 1E:
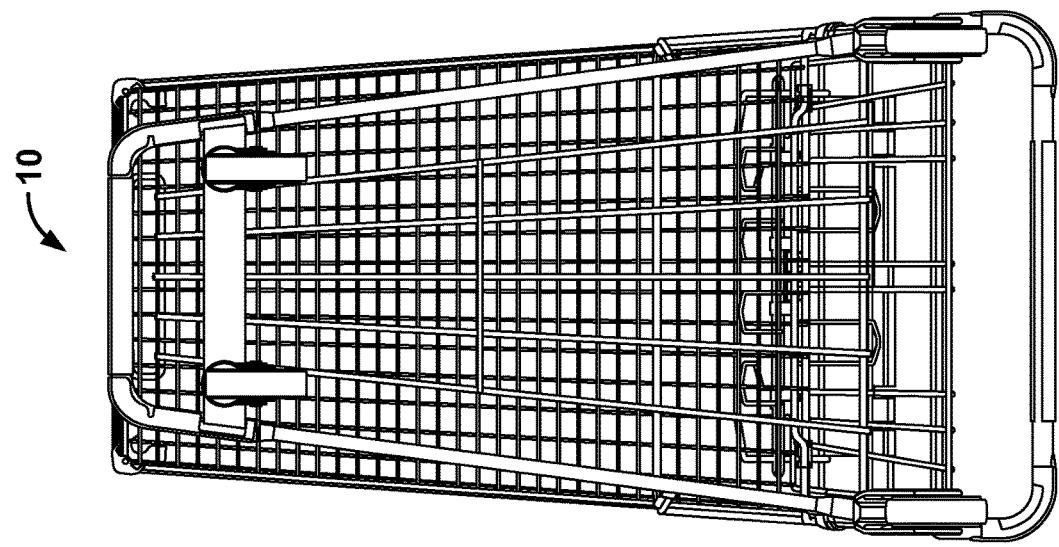
FIG. 1E is a bottom view of the shopping cart of FIG. 1A.
Figure 1F:
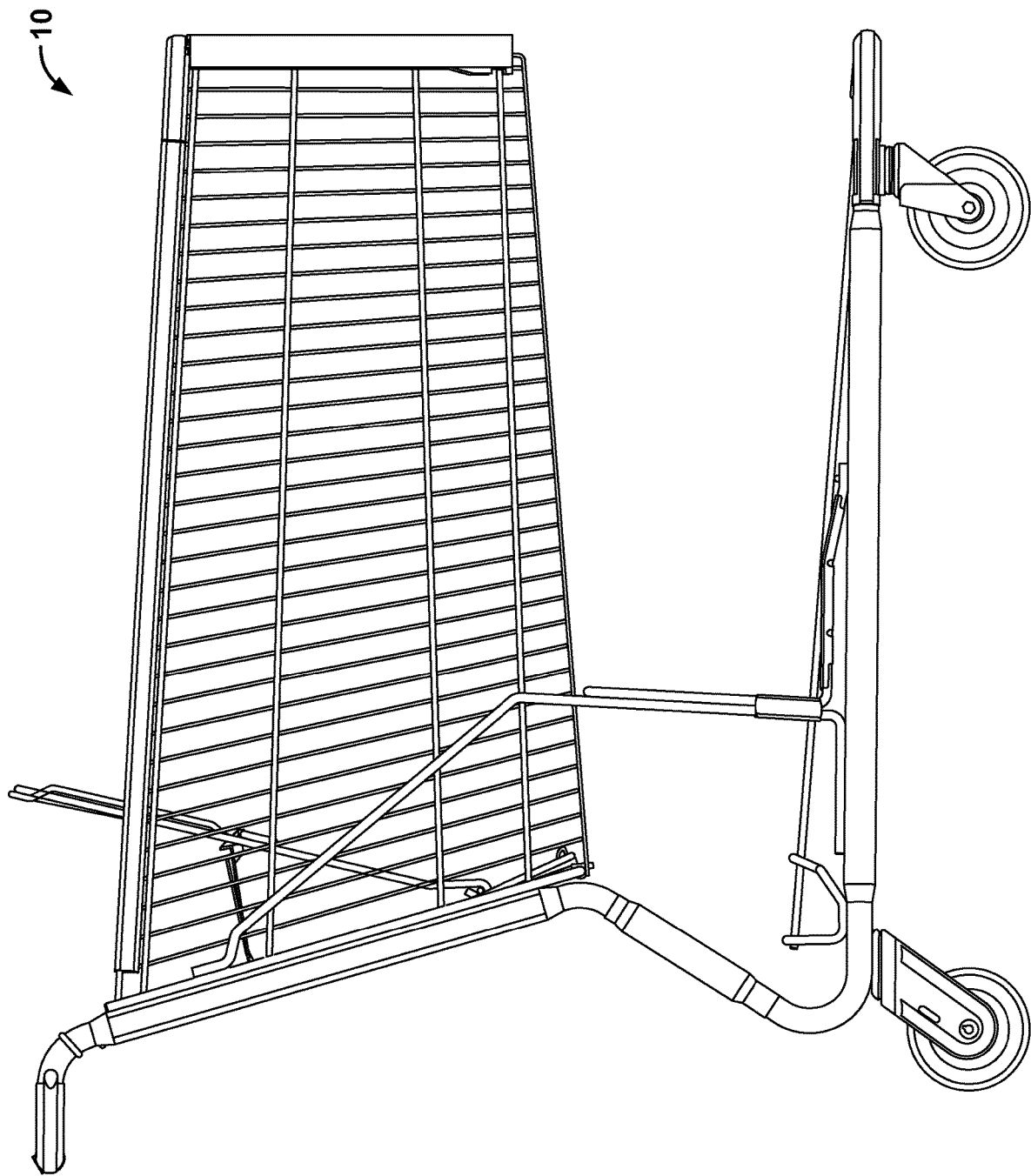
FIG. 1F is a side view of the shopping cart of FIG. 1A.

Further, it is to be understood that the drawings may represent the scale of different components of one single embodiment; however, the disclosed embodiments are not limited to that particular scale.

DETAILED DESCRIPTION OF EMBODIMENTS

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "proximal," "distal," and the like may be used in this specification to describe various example features and elements of the invention, these terms are used herein as a matter of convenience, e.g., based on the example orientations shown in the figures or the orientation during typical use. Nothing in this specification should be construed as requiring a specific three dimensional orientation of structures in order to fall within the scope of this invention, unless explicitly specified by the claims. "Integral joining technique," as may be used herein, means a technique for joining two pieces so that the two pieces effectively become a single, integral piece, including, but not limited to, irreversible joining techniques such as welding, brazing, soldering, or the like, where separation of the joined pieces cannot be accomplished without structural damage thereto.

Referring first to FIGS. 1A-1F, there is shown an example embodiment of an American-market, full-size, adult, wire-made shopping cart 10. It is understood that the shopping cart 10 in FIGS. 1A-1F is shown by way of example, and the features described in more detail below may be usable with many other differently configured shopping carts.

The cart 10 includes a frame 12, that may be formed of a plurality of frame members, formed from steel tubing, and the frame 12 includes a chassis portion 14, to which casters 16 are mounted, and a handle portion 18. The rear two casters 16 track forward and back, and the front two casters 16 can also swivel. The frame 12 supports a basket 20 that defines a chamber 21 for holding articles. The chassis portion 14 may also include and support a lower shelf 17 that can also support articles. The basket 20 includes a front wall 22, a rear wall or gate 24, and side walls 26 extending between the front and rear walls 22, 24, as well as a bottom or floor 23. The rear wall or gate 24 is configured as a swinging real wall or gate, and may further be provided with a collapsible child seat 28. The basket 20 is connected to the chassis portion 14 and the handle portion 18 of the frame 12, by welding or other connection. The basket 20 and the lower shelf 17 are formed by metal wires as illustrated in FIGS. 1A-1F.

The basket 20 may be formed by a mesh of crossing wires that may be generally horizontal (extending between the sides 26 of the basket 20), generally vertical wires (extending from the top of the basket 20 toward the surface on which the cart 10 rests), or generally longitudinal (extending between the front 22 and rear 24 of the basket 20).

Figure 8A:
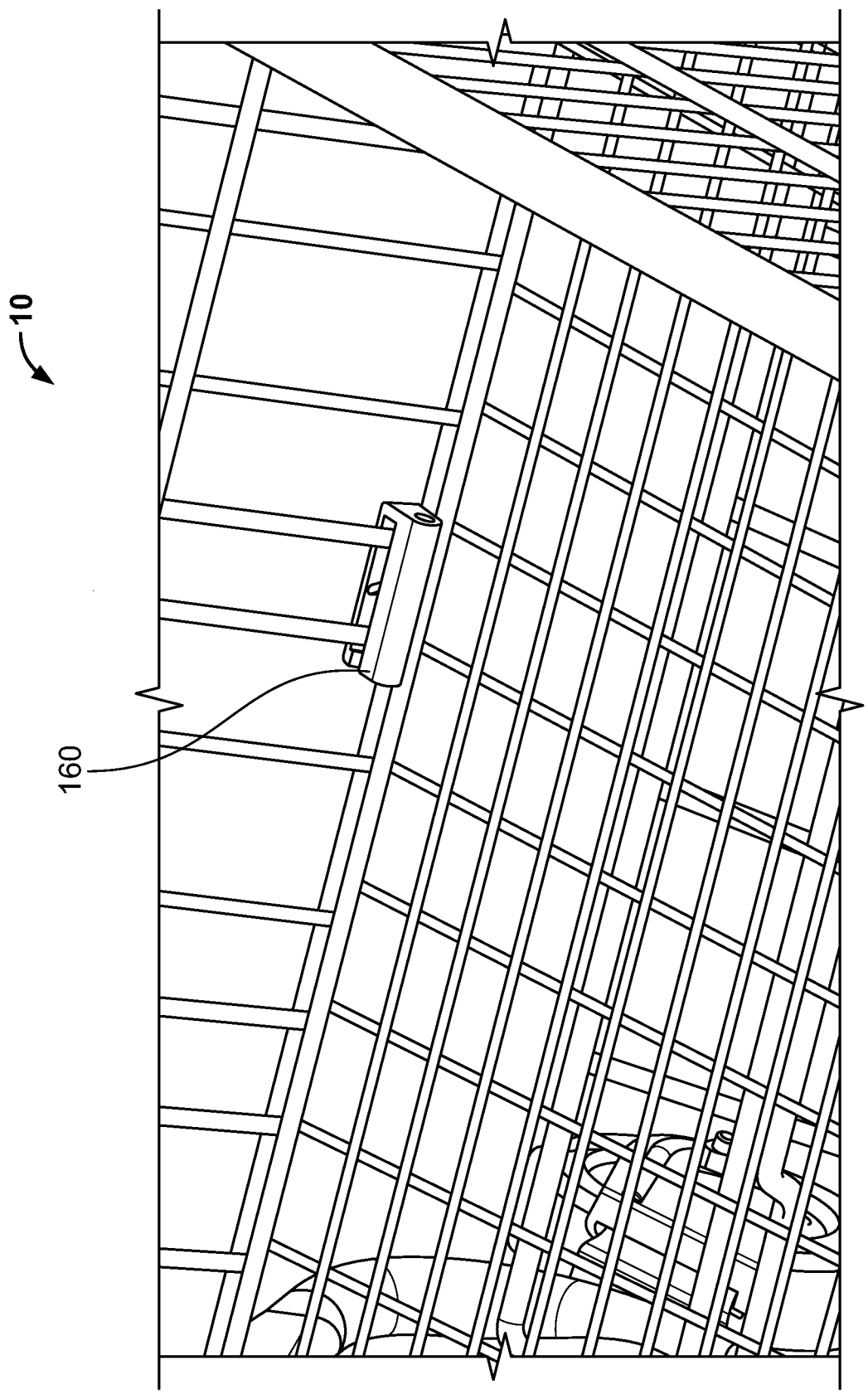
FIG. 8A depicts a perspective view of a gate nesting bumper of a shopping cart according to aspects of the present disclosure.
Figure 8B:
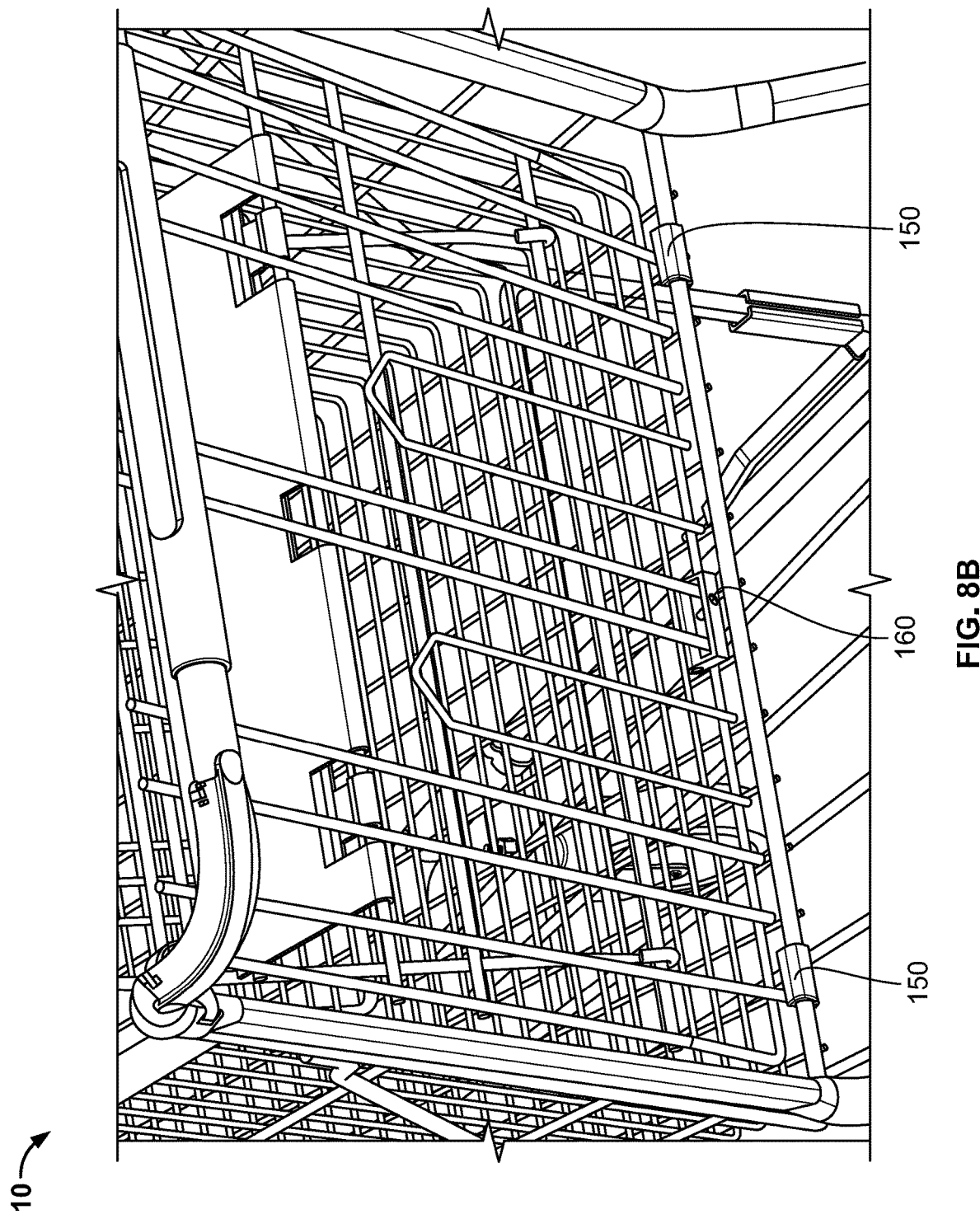
FIG. 8B depicts a rear perspective view of basket end rim bumpers and a gate nesting bumper of a shopping cart according to aspects of the present disclosure.
Figure 8C:
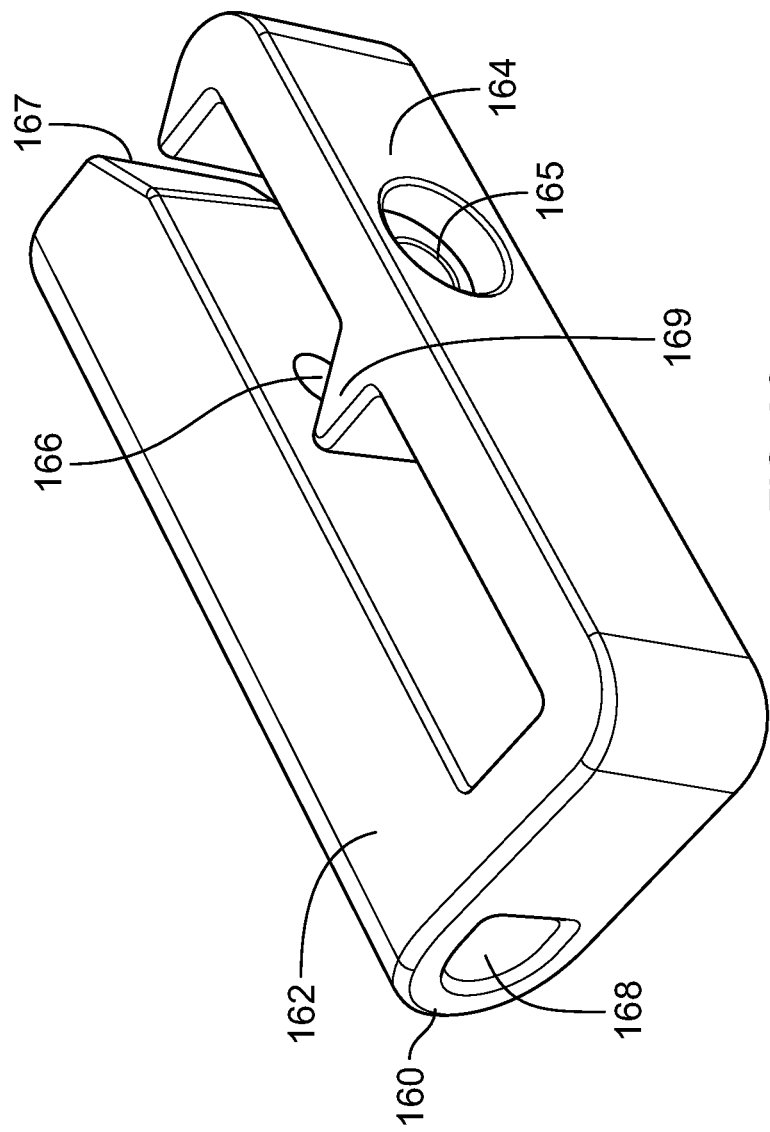
FIG. 8C illustrates a gate nesting bumper of a shopping cart according to aspects of the present disclosure.
Figure 8D:
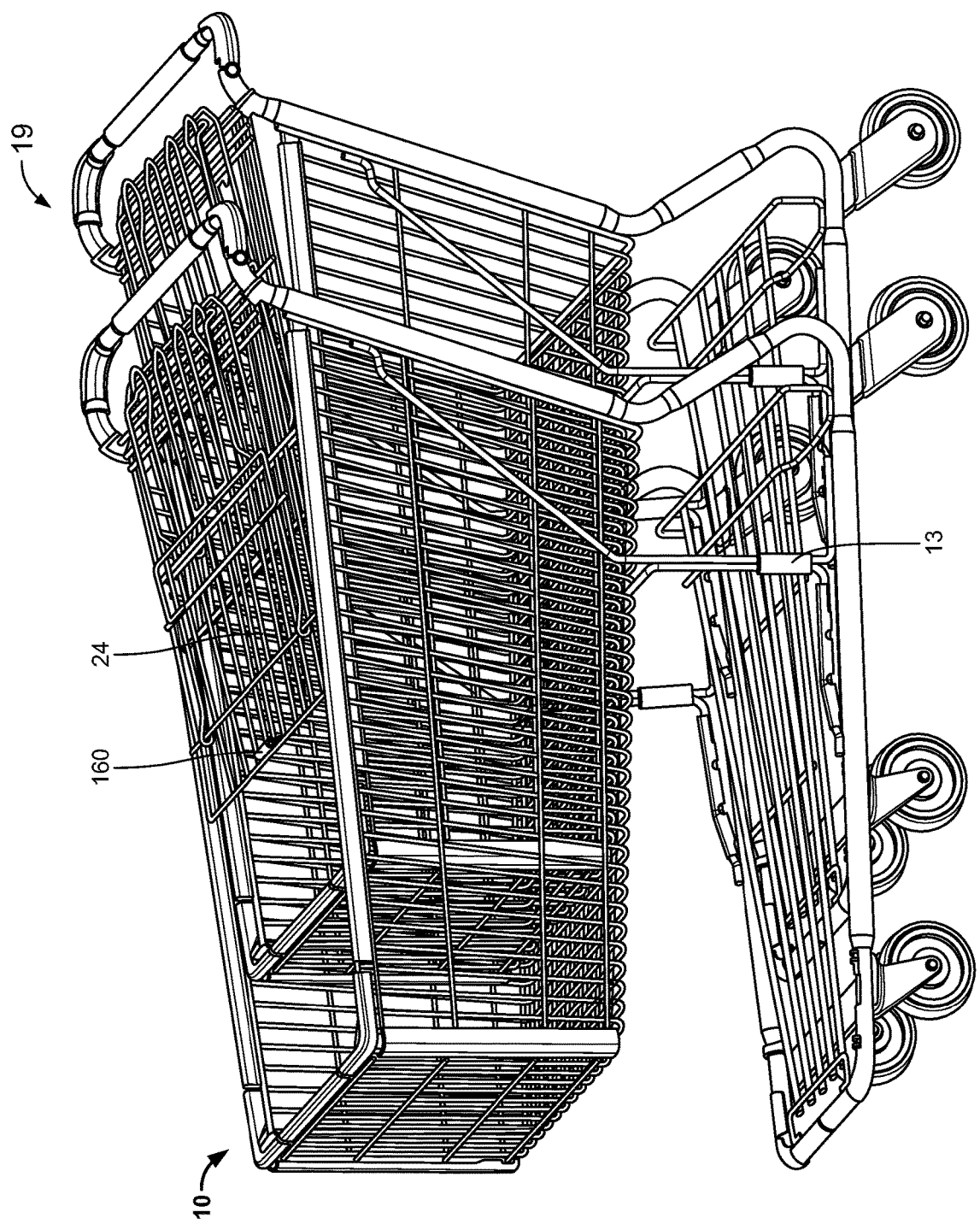
FIG. 8D depicts a perspective view of two shopping carts nested together having gate nesting bumpers according to aspects of the present disclosure.
Figure 8E:
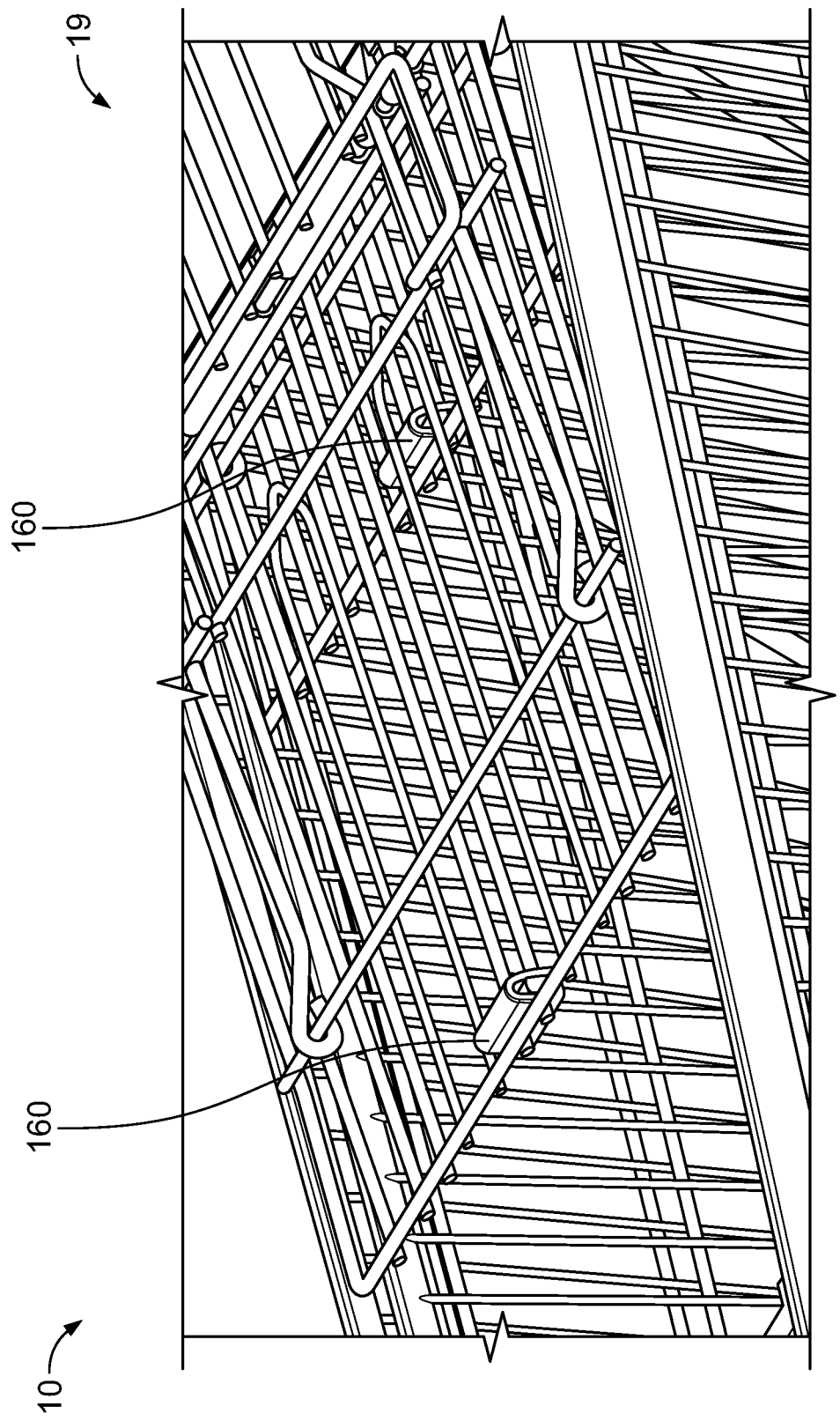
FIG. 8E depicts an enlarged perspective view of the two shopping carts nested together having gate nesting bumpers of FIG. 8D.

As shown in FIGS. 8D and 8E, the cart 10 is configured to be nested with a second cart 19, typically identical to the cart 10. In this nesting configuration, the rear wall/gate 24 of the second cart 19 swings upward as the basket 20 of the cart 10 is pushed inside the basket 20 of the second cart 19. The carts 10, 19 have a nesting stop 13 that serves as a point of contact between the two carts 10, 19, limiting the nesting distance, i.e., the distance between identical points on the two carts 10, 19, when the carts 10, 19 are fully nested. It is understood that the nesting stop 13 may be created by different structures in different locations in other carts.

According to aspects of this disclosure, the cart 10 may include various features that may reduce wear to a cart. These features are discussed in more detail below.

As shown in FIGS. 2A-2B the shopping cart 10 may include a frame corner bumper 54.

The frame may also include a frame nose bumper (not shown). The frame corner bumper 54 may be formed as a single part or may be formed of a plurality of pieces. As shown in FIGS. 2A-2B the frame includes two corner bumpers 54. In certain examples, the cart may include an additional frame nose bumper configured to engage the front of the frame. The corner bumpers 54 may be universal or symmetrical such that the corner bumper 54 on each side of the cart 10 is the same. The frame nose bumper and the corner bumpers 54 may be formed of various materials including plastics, nylon, rubbers, composite materials, and other materials. The frame nose bumper and the corner bumpers 54 may attach to the front and side portions of the frame 12 and protect the frame from wear and collisions. The corner bumpers 54 and a nose bumper may attach to the frame 12 using many known methods including mechanical fasteners, such as screws, rivets, bolts, etc., and also including adhesives. The mechanical fastener may also include a self-tapping screw or pin to assist in theft protection. As shown in FIGS. 2A-2B the frame corner bumpers 54 may attach to the frame 12 using a retention clip 122 to secure the bumper 54 in place. In other examples, the corner bumpers 54 may attach to the frame via snap-on construction.

As shown in FIG. 3 the shopping cart 10 may include an integrated, single piece, caster lift guard 60 and nest stop guard 70. The caster lift guard 60 and the nest stop guard 70 may be integrally joined. The one-piece caster lift guard 60 and nest stop guard 70 may be formed of various materials including plastics, nylon, rubbers, composite materials, and other materials. As shown in FIG. 3 the integrated caster lift guard portion 60 may attach to the caster lift portion of the cart 10 and may help reduce damage and corrosion caused by carts nesting with each other, and the nest stop guard portion 70 may be located at the nesting stop 13 and may help reduce damage and corrosion caused by carts nesting with each other. The integrated caster lift guard 60 and nest stop guard 70 may attach to the cart 10 using many known methods including mechanical fasteners, such as screws, rivets, bolts, etc., and also including adhesives. As shown in FIG. 3 the integrated caster lift guard 60 and nest stop guard 70 may attach to the cart 10 using a snap-on construction.

Figure 4A:
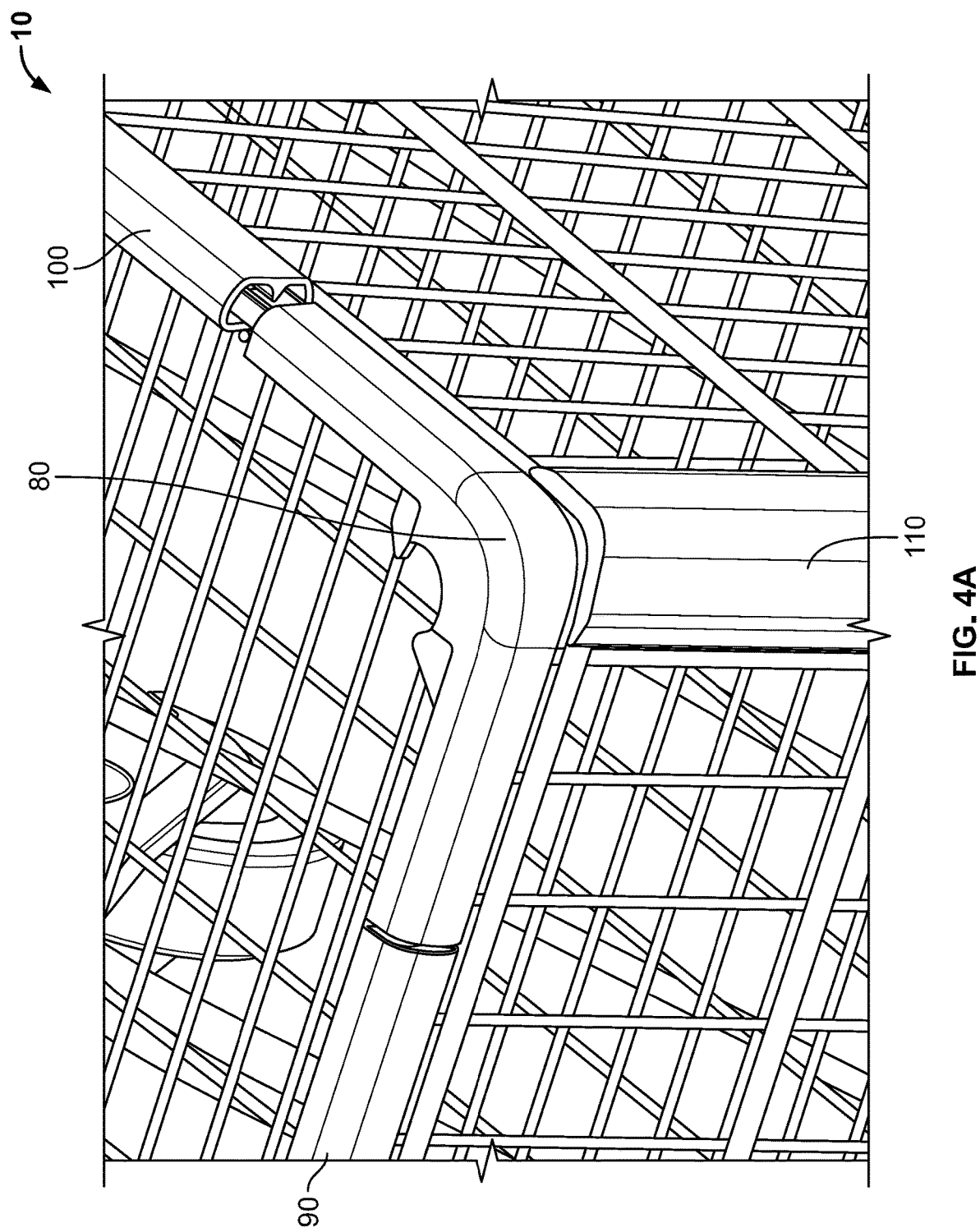
FIG. 4A depicts a perspective view of a corner bumper, nose guard, side guard and front guard of a shopping cart according to aspects of the present disclosure.
Figure 4B:
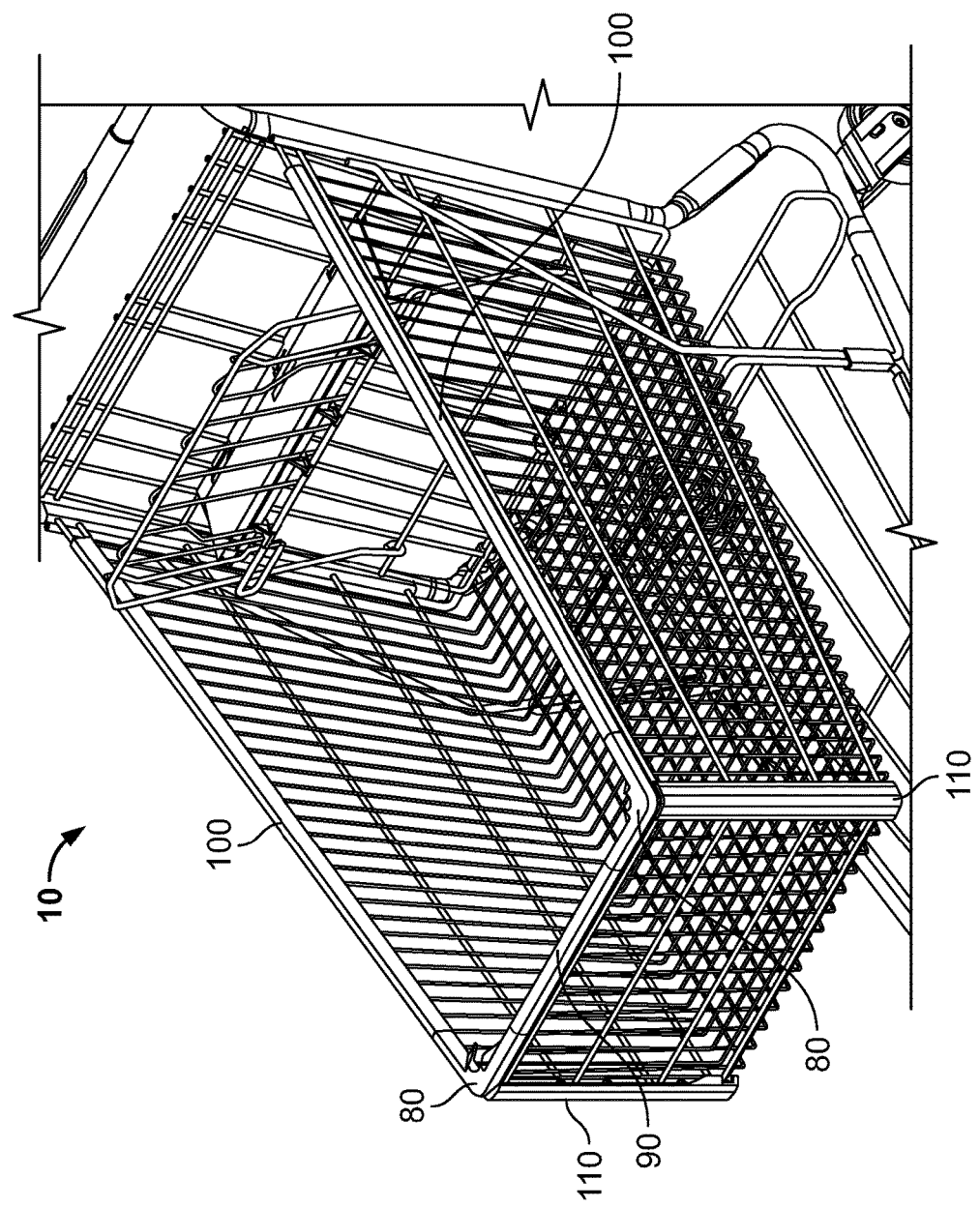
FIG. 4B depicts a perspective view of a corner bumper, nose guard, side guard and front guard of a shopping cart according to aspects of the present disclosure.
Figure 4C:
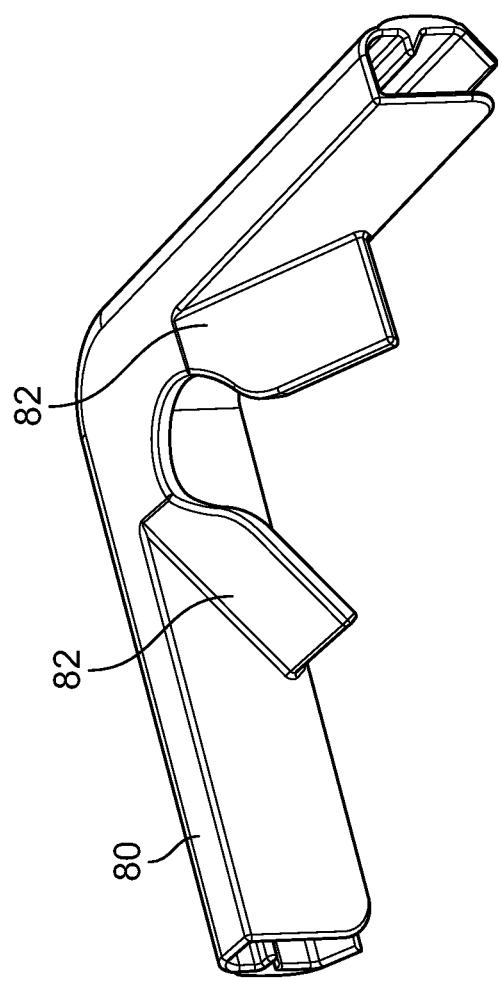
FIG. 4C depicts a perspective view of a corner bumper of a shopping cart according to aspects of the present disclosure.

As shown in FIG. 4A-4C the shopping cart 10 may include a corner bumper 80, nose guard 90, side guards 100, and front guards 110. The corner bumpers 80, nose guard 90, side guards 100, and front guards 110 may be formed of various materials including plastics, nylon, rubbers, composite materials, and other materials. As shown in FIGS. 4A-4C the corner bumpers 80, nose guard 90, side guards 100, and front guards 110 may attach to the shown portions of the cart 10 and may help reduce damage and corrosion caused by carts nesting with each other. The corner bumpers 80, nose guard 90, side guards 100, and front guards 110 may attach to the cart 10 using many known methods including mechanical fasteners, such as screws, rivets, bolts, etc., and also including adhesives. As shown in FIGS. 4A-4C the corner bumpers 80, nose guard 90, side guards 100, and front guards 110 may attach to the cart 10 using a snap-on construction. Each of the corner bumpers 80, side guards 100, and front guards 110 may be symmetrical such that they can be used on either side of the cart 10.

As best shown in FIG. 4C, the corner guard or bumper 80 includes two wings 82 extending from an inner wall of the corner bumper 80. The wings 82 may allow carts to nest together more efficiently and may reduce the amount that carts stick together during use assisting with gate fall through when a user removes a cart from a nested position. As described above, the wings 82 are symmetrical such that the corner bumper 80 may be used on either side of the cart 10.

Figure 5A:
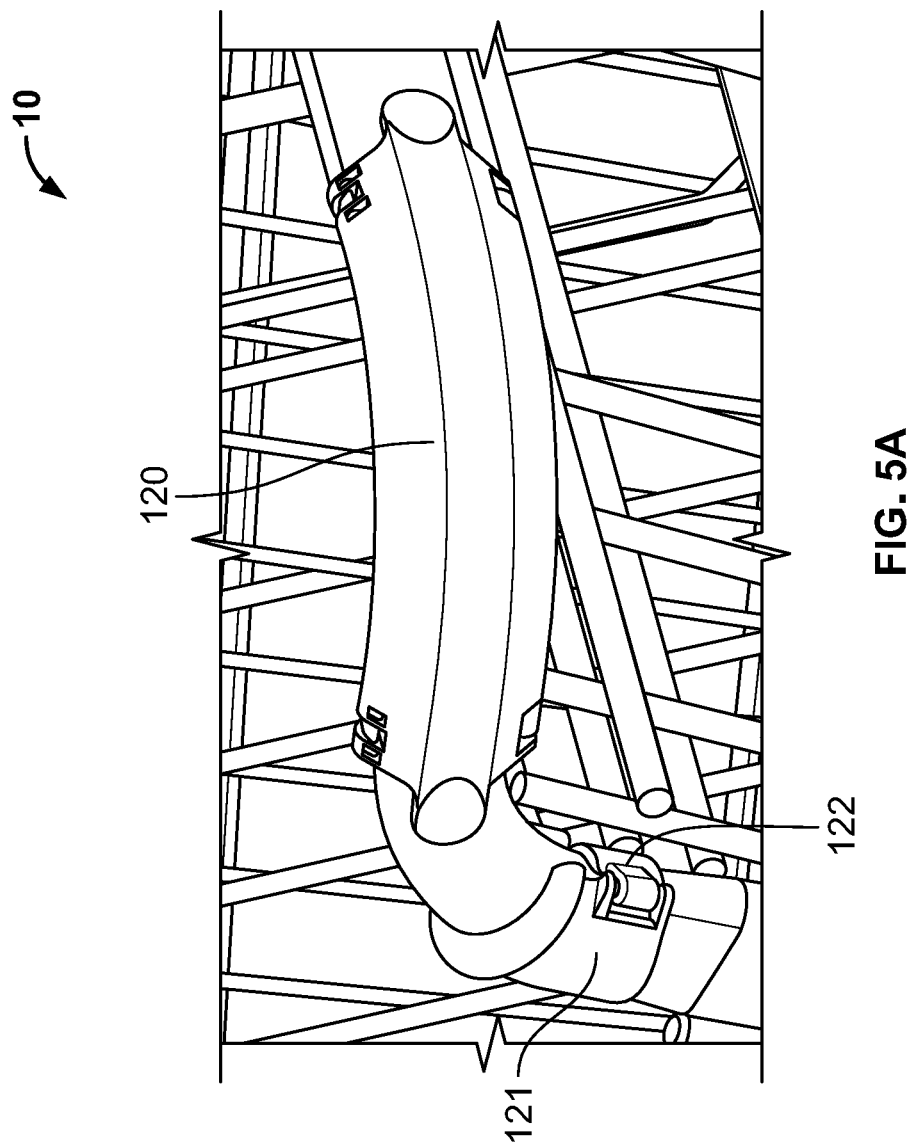
FIG. 5A depicts a perspective view of a rear handle guard and a forward handle guard with retention clips of a shopping cart according to aspects of the present disclosure.
Figure 5B:
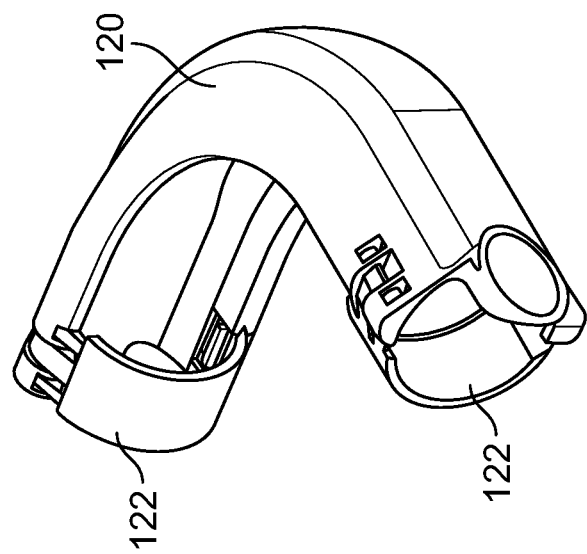
FIG. 5B depicts a perspective view of a rear handle guard of a shopping cart with the retention clips in a closed and locked configuration according to aspects of the present disclosure.

As shown in FIG. 5A-5B the shopping cart 10 may include rear handle guards 120 and forward handle guards 121 arranged in a position corresponding to where the handle starts to bend downward. The rear handle guards 120 and forward handle guards 121 may be formed of various materials including plastics, nylon, rubbers, composite materials, and other materials. As shown in FIG. 5A the rear handle guards 120 and forward handle guards 121 may attach to the frame 12 of the cart 10 and may help reduce abrasion damage and resulting corrosion caused by usage of the cart. The rear handle guards 120 and forward handle guards 121 may attach to the cart 10 using many known methods including mechanical fasteners, such as screws, rivets, bolts, etc., and also including adhesives. As shown in FIGS. 5A-5B rear handle guards 120 and forward handle guards 121 may attach to the cart 10 using a retention clip 122. In other examples, rear handle guards 120 and forward handle guards 121 may attach to the cart 10 using a snap-on construction. Each of the rear handle guards 120 and forward handle guards 121 may be symmetrical such that they can be used on either side of the cart 10. Each of the rear handle guards 120 and forward handle guards 121 may include one or more retention clips 122 to secure the guards to the cart 10.

Figure 6B:
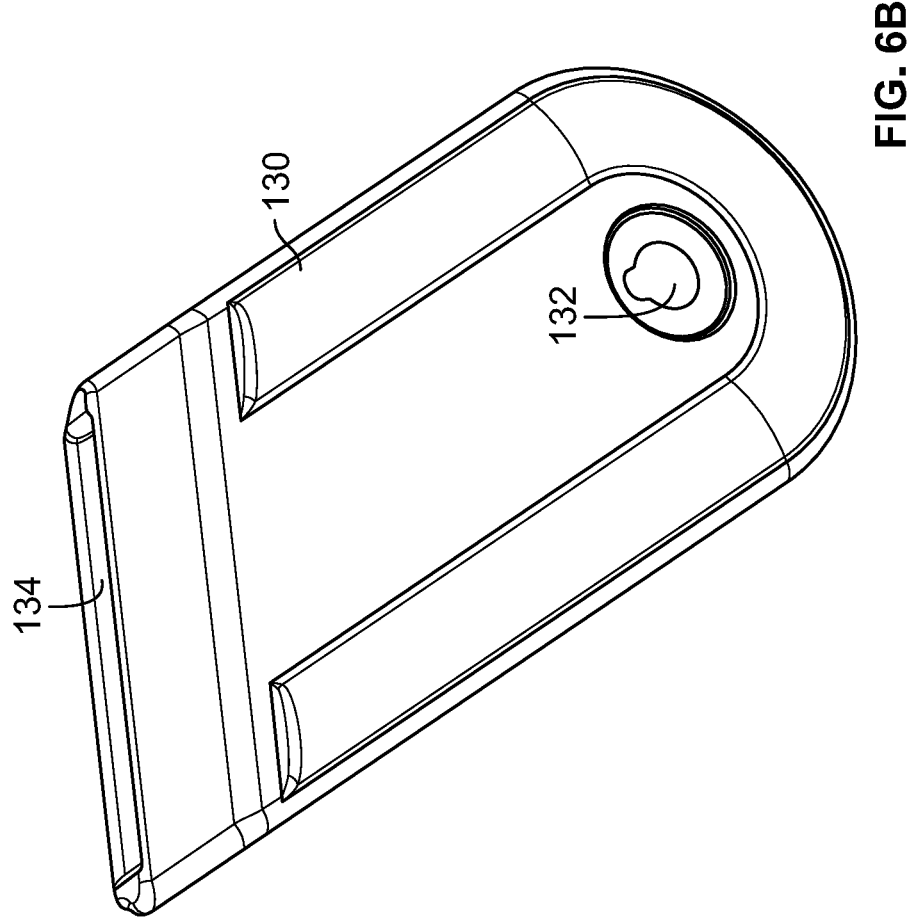
FIG. 6B depicts an outer perspective view of a unified horn cover of a shopping cart according to aspects of the present disclosure.
Figure 6C:
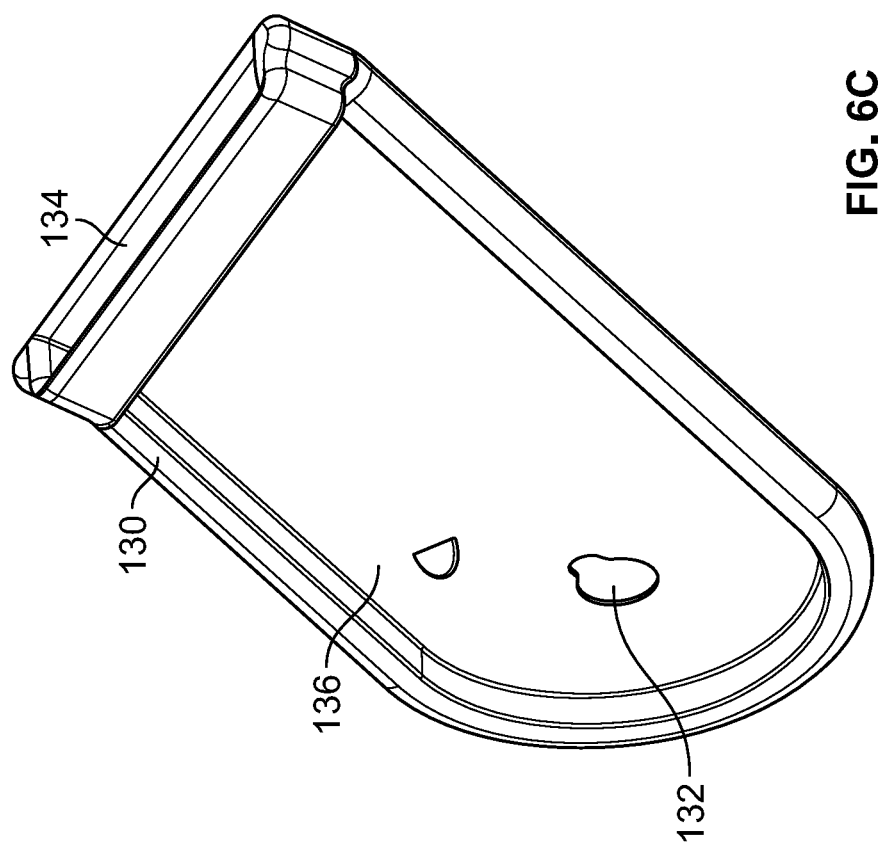
FIG. 6C depicts an inner perspective view of a unified horn cover of a shopping cart according to aspects of the present disclosure.

As shown in FIG. 6A-6C the shopping cart 10 may include unified horn cover 130. The unified horn cover 130 may be formed of various materials including plastics, nylon, rubbers, composite materials, and other materials. As shown in FIGS. 6A-6C and FIGS. 1A-1F, there may be two unified horn covers 130 per wheel or four per cart (an inner unified horn cover and an outer unified horn cover on each wheel). The unified horn cover 130 may attach to the horn of the cart 10 and may help reduce damage and corrosion caused by usage of the cart. The unified horn covers 130 may attach to the cart 10 using many known methods including mechanical fasteners, such as screws, rivets, bolts, etc., and also including adhesives. As shown in FIGS. 6A-6C the unified horn covers 130 may include a passageway 132 which may be slid over the horn and the unified horn covers 130 may include a depressed area 134 configured to fit the horn. Once the unified horn cover 130 is slid over the horn, it may be fastened in place using a bolt 136.

As shown in FIGS. 7A-7B the shopping cart 10 may include a rear upright guard 140. The rear upright guard 140 may be universal such that the rear upright guard 140 on each side of the cart 10 is the same. The rear upright guard 140 may be formed of various materials including plastics, nylon, rubbers, composite materials, and other materials. The rear upright guard 140 may attach to the frame 12 and protect the frame from wear and collisions. The rear upright guard 140 may attach to the frame 12 using many known methods including mechanical fasteners, such as screws, rivets, bolts, etc., and also including adhesives. As shown in FIGS. 7A-7B the rear upright guard 140 may attach to the frame 12 using a snap-on construction.

As shown in FIG. 8A-8E the shopping cart 10 may include basket end rim bumpers 150 and/or a gate nesting bumper 160. The basket end rim bumpers 150 may assist in reducing wear and corrosion in the bottom area of the basket and the gate nesting bumper 160 may assist in reducing wear caused by nesting of the carts. The basket end rim bumpers 150 and gate nesting bumper 160 may be formed of various materials including plastics, nylon, rubbers, composite materials, and other materials.

As shown in FIG. 8B the basket end rim bumpers 150 may attach to a lower portion of the basket and may be configured to contact the gate when the gate is in its normal downward usage position. The basket end rim bumpers 150 may attach to the cart 10 using many known methods including mechanical fasteners, such as screws, rivets, bolts, etc., and also including adhesives. As shown in FIG. 8B the basket end rim bumpers 150 may attach to the cart 10 using a snap-on construction. Each of the basket end rim bumpers 150 may be symmetrical such that they can be used on either side of the cart 10.

As also shown in FIGS. 8A-8E the gate nesting bumper 160 may attach to a lower portion of the rear gate and may be configured to contact a rear gate of an adjacent cart when the carts are in a nested position. The gate nesting bumper 160 may attach to the cart 10 using many known methods including mechanical fasteners, such as screws, rivets, bolts, etc., and also including adhesives and/or snap-on constructions. As shown in FIG. 8C the gate nesting bumper 160 may include a front piece 162 and a back piece 164 that may be engaged together using a mechanical fastener through a central portion of the gate nesting bumper. Alternatively, the gate nesting bumper 160 may include a first socket 165 and a second socket 166 arranged slightly off-center, proximal to a slot 167, and configured to engage a mechanical fastener. The nesting gate bumper 160 may also include the slot or opening 167 that allows the gate nesting bumper 160 to be positioned on the rear gate (or removed and replaced) prior to securing the nesting bumper 160 in place. The gate nesting bumper 160 may also include a hollow portion 168 arranged along a front horizontal axis of the bumper 160. The hollow portion 168 provides additional wear resistance and functions as a shock absorber and reduces the amount of material needed to manufacture the bumper 160. The gate nesting bumper 160 may also include a spacer 169 configured to assist with arranging the bumper 160 on the wires forming the rear gate. As shown in FIGS. 8A-8B and 8D-8E the gate nesting bumper 160 is engaged with and secured to the rear gate.

As best shown in FIG. 8E, the gate nesting bumper 160 of cart 19 is configured to contact the underside of the rear gate of cart 10 in front of gate 19 when the carts 10, 19 are in a nested position. The gate nesting bumper 160 is configured to space the gate of cart 10 from the gate of cart 19 when in the nest position. Such spacing advantageously may reduce wear on the gates of carts during nesting by preventing metal on metal abrasion that leads to corrosion.

Figure 9:
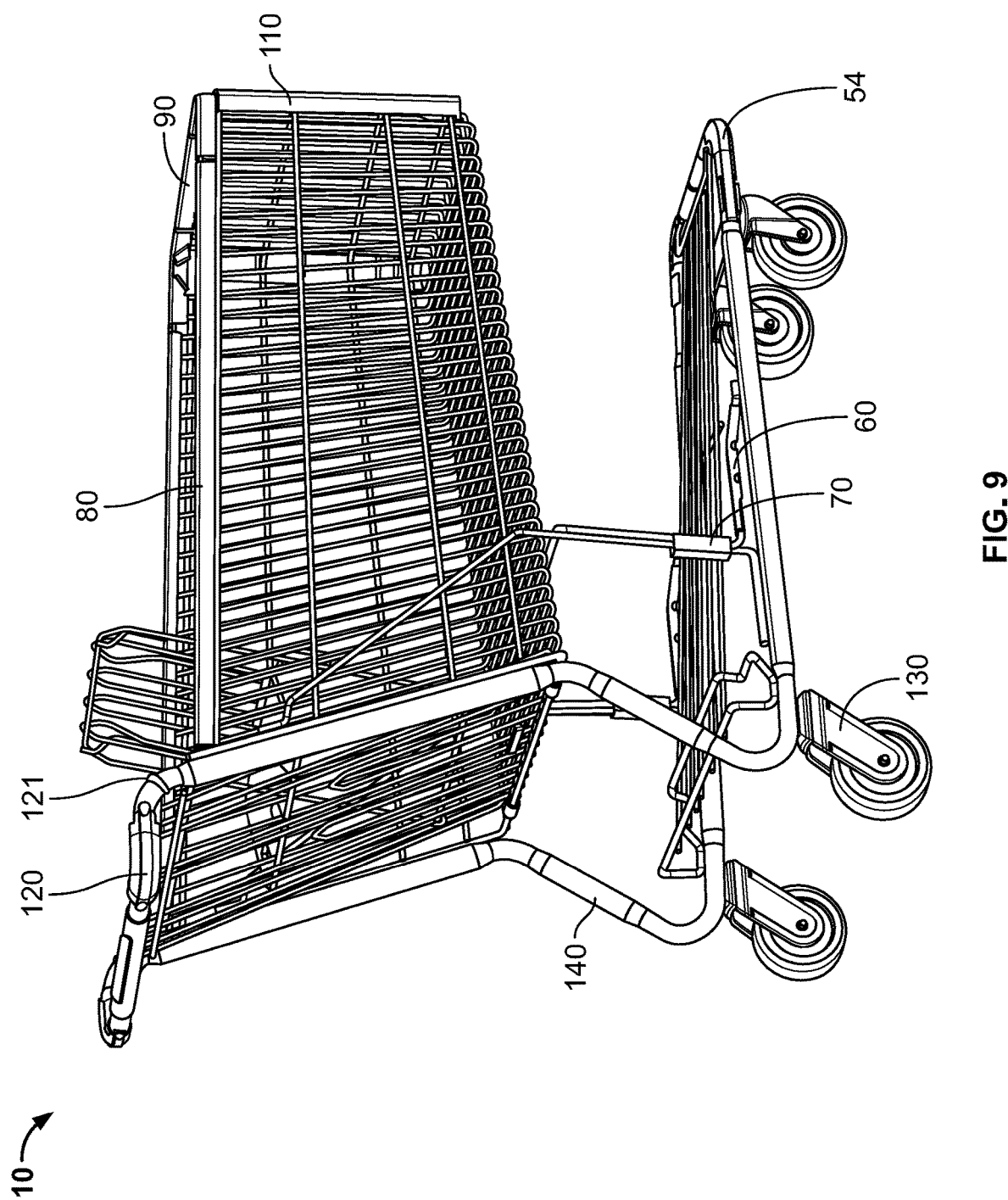
FIG. 9 depicts a perspective view of one embodiment of a shopping cart according to aspects of the present disclosure.

FIG. 9 depicts a perspective view of an embodiment of a shopping cart 10 according to aspects of the present disclosure including features described above. Although the shopping cart 10 is shown having all wear resistance features 54, 60, 70, 80, 90, 100, 110, 120, 121, 130, 140, 150, and 160, in certain embodiments, shopping carts 10 may include only some of the wear resistance features described above.

Figure 10:
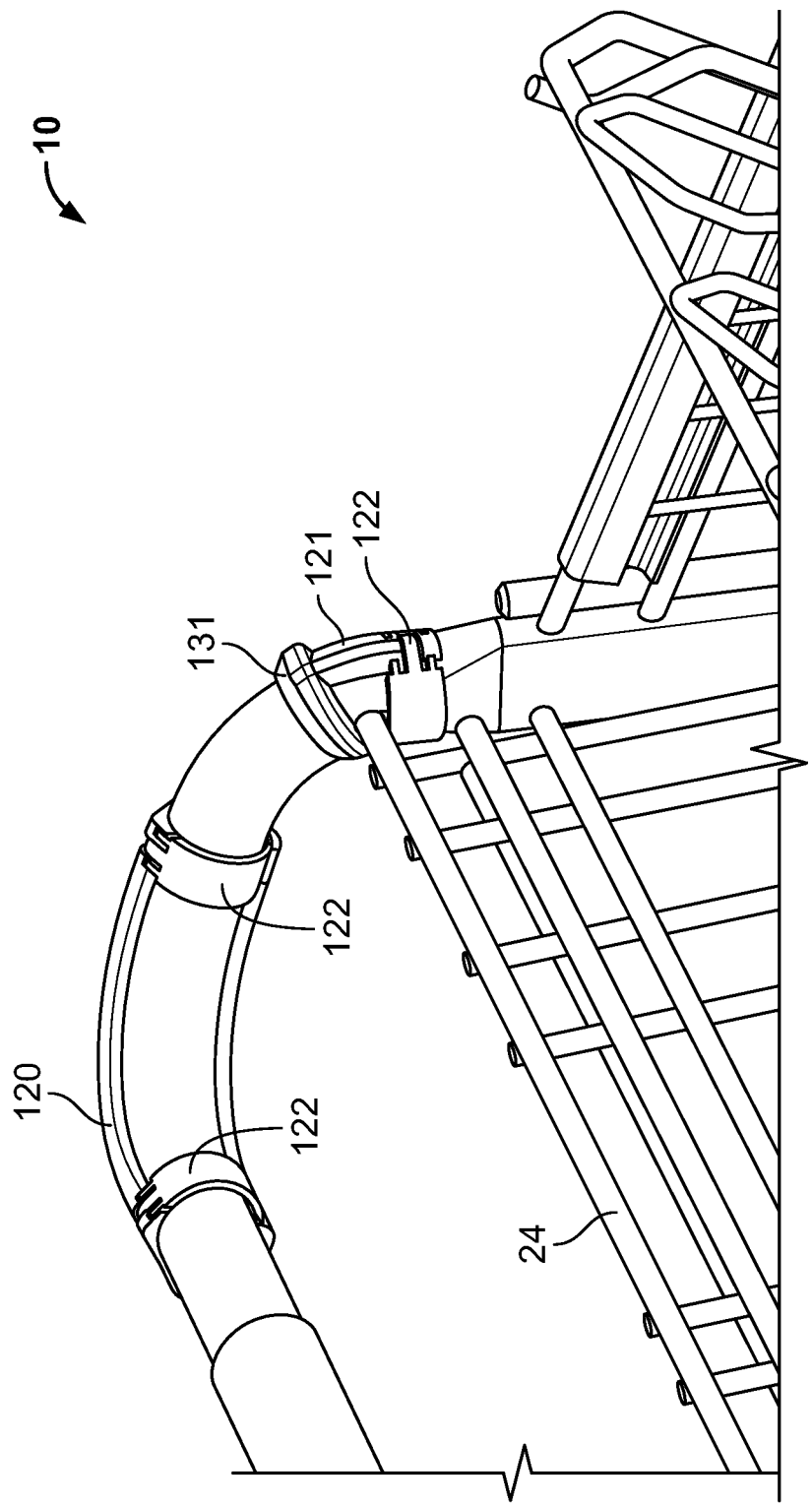
FIG. 10 depicts a perspective view of a forward and a rear handle guard of a shopping cart according to aspects of the present disclosure.
Figure 11:
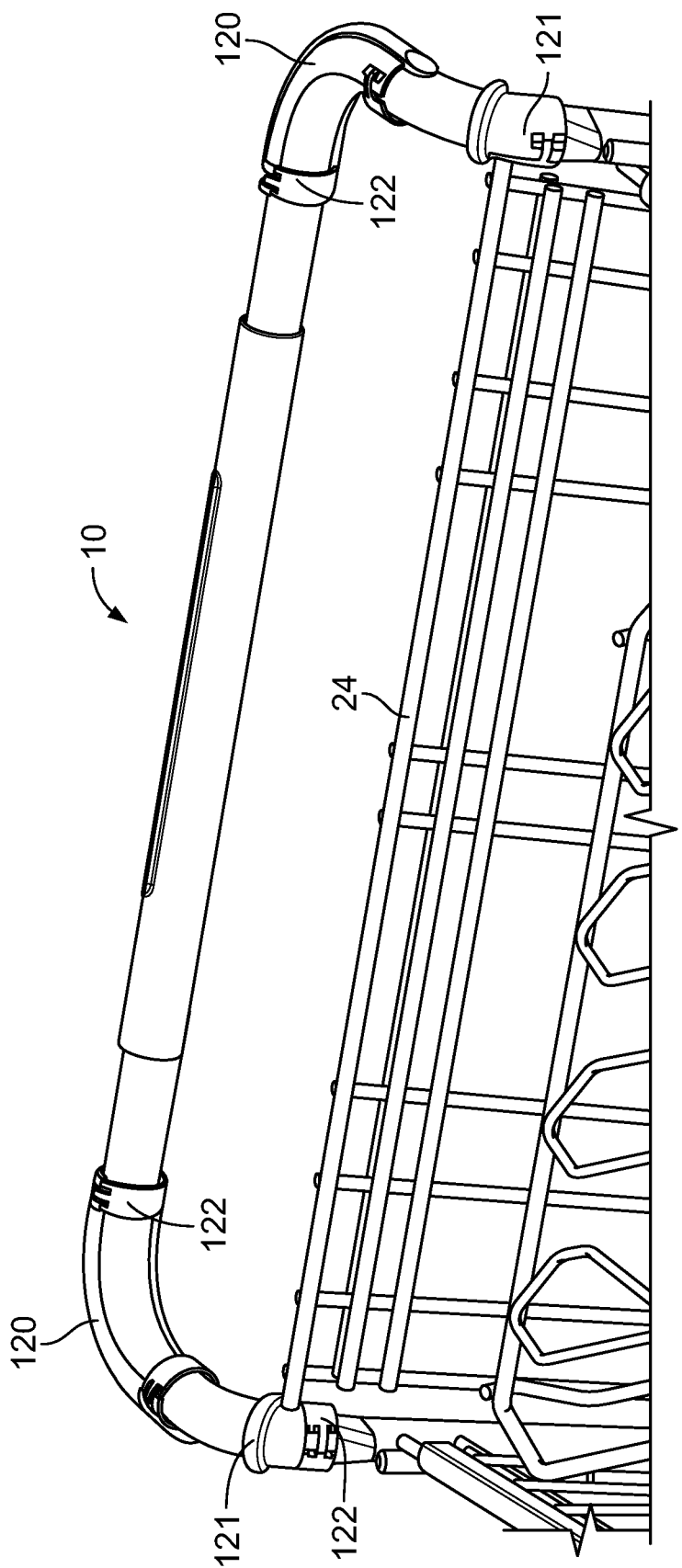
FIG. 11 depicts another perspective view of the forward handle guards and the rear handle guards of a shopping cart according to aspects of the present disclosure.

FIG. 10 depicts a rear perspective view of a forward handle guard 121 and a rear handle guard 120. The rear handle guard 120 may be secured in place by retention clip 122. In some examples, the rear handle guard 120 may include a single retention clip 122. In other examples, the rear handle guard 120 may include at least two retention clips 122. The shopping cart may also include a forward handle guard 121 that may also include at least one retention clip 122 to secure the forward handle guard 121 to the cart. The forward handle guard may also include a raised boss portion or rib 131. The raised boss portion 131 provides an additional contact area to provide increased protection and resistance to wearing due to cart nesting or other impacts that typically damage the cart. Both the rear handle guard 120 and the forward handle guard 121 may be symmetrical and configured to engage either the left or right side of the cart. As shown in FIG. 11, shopping cart 10 may include a left and right rear handle guard 120 secured to the cart 10 with at least two retention clips 122. Shopping cart 10 may also include a left and right forward handle guard 121 secured to the shopping cart 10 with retention clip 122. As shown in FIGS. 10 and 11, forward handle guard 121 may be configured to engage the cart handle as it begins to bend downward and engage the top of the rear gate 24. The configuration of the forward handle guard 121 permits the rear gate 24 to swing from a nested position to the open position.

Figure 12A:
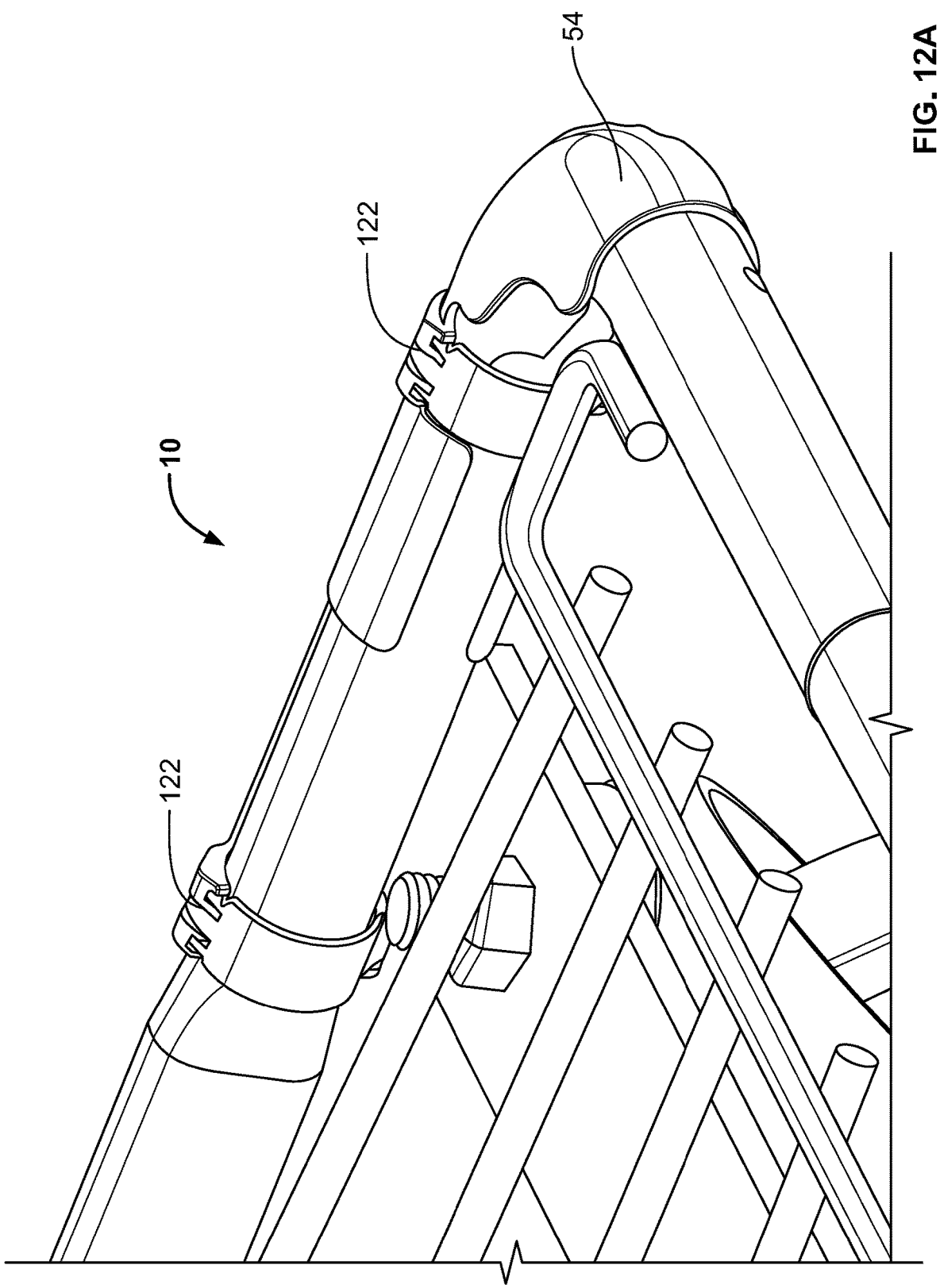
FIG. 12A depicts an upper perspective view of a frame nose bumper with retention clips of a shopping cart according to aspects of the present disclosure.
Figure 12B:
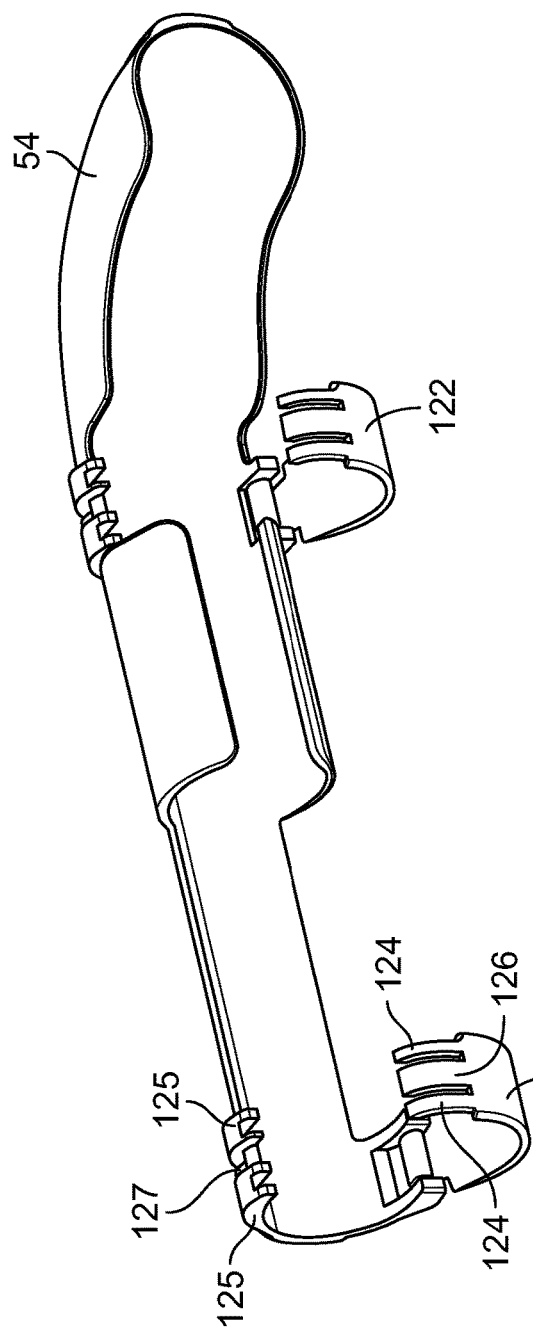
FIG. 12B depicts a perspective view of the frame nose bumper of FIG. 12A with the retention clips in the open and unlocked configuration according to aspects of the present disclosure.
Figure 12C:
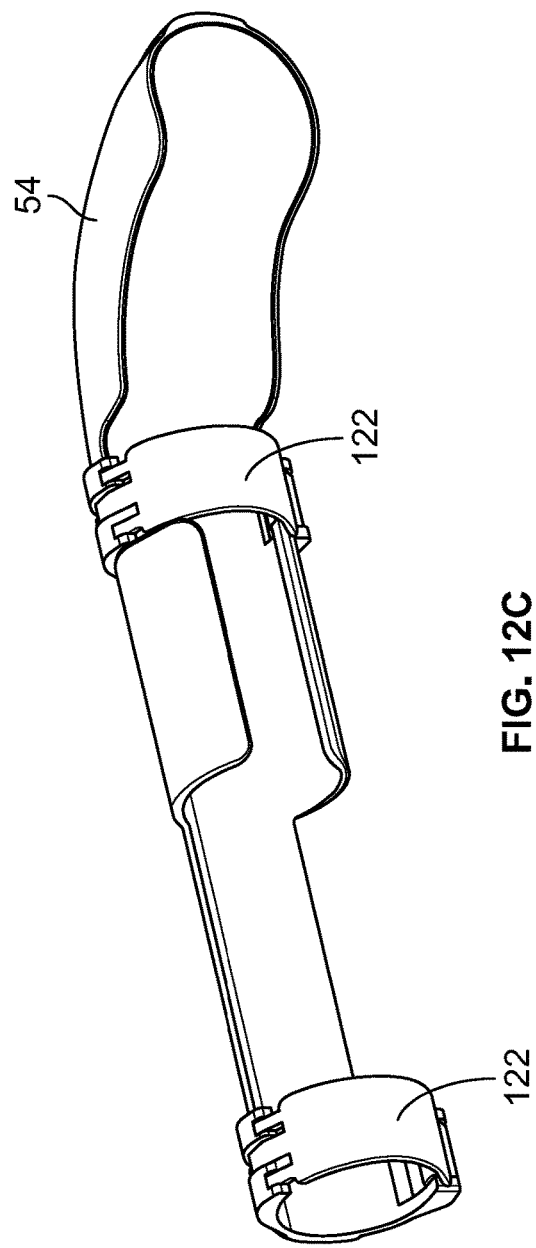
FIG. 12C depicts a perspective view of the frame nose bumper of FIG. 12A with the retention clips in the closed and locked configuration according to aspects of the present disclosure.

FIGS. 12A-12C depict the frame nose bumper 54 of shopping cart 10 with the retention clips 122 in the open and unlocked configuration, as well as the closed and locked configuration. As shown in FIG. 12A, the frame nose bumper 54 may be secured to the shopping cart 10 with retention clips 122. A frame nose bumper 54 may be configured on each side of the shopping cart 10. The frame nose bumper 54 may be symmetrical and configured to engage either the left or right side of the cart 10. The retention clips 122 are shown in the open and unlocked position in FIG. 12B. The retention clip 122 may include fingers 124 and locking finger 126. The fingers 124 are configured to releasably engage the finger guides 125 and the locking finger 126 is configured to releasably engage the locking finger guide 127 configured on the nose bumper 54 or other bumpers and guards described herein. The retention clip 122 prevents the bumper or guard from rotating on the cart 10 and may allow replacement of a damage bumper or guard. The retention clips 122 may also allow bumpers or guards to be retrofitted to shopping carts 10 without abrasion protection devices. As shown in FIG. 12C, the retention clip 122 is in the closed and locked configuration with the fingers 124 engaged with the finger guides 125 and the locking finger 126 is engaged with the locking finger guide 127. By using a special tool or screwdriver, the locking finger 126 may be released from the locking finger guide 127 and the nose bumper 54 may be returned to the open and unlocked configuration for replacement or repair.

Figure 13:
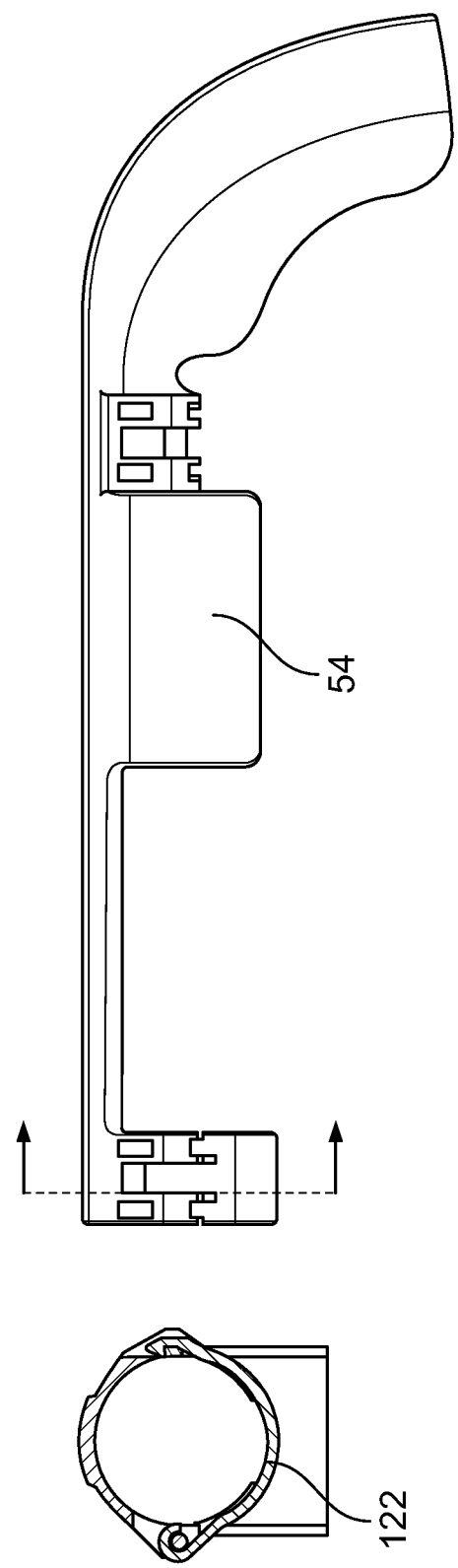
FIG. 13 depicts alternative views of a frame nose bumper with a retention clip of a shopping cart according to aspects of the present disclosure.

FIG. 13 depicts multiple views of the nose bumper 54 with the retention clip 122 in the closed and locked configuration. In some examples, the nose bumper may include multiple retention clips 122 to help secure the nose bumper to the cart 10. The retention clip 122 may be configured with any of the bumpers or guards disclosed herein and may be easily retrofitted on existing shopping carts for abrasion protection.

FIGS. 14A-14B illustrate the novel retention clip 122 configured to engage any of the various types of bumpers and guards disclosed herein to provide abrasion and impact resistance for shopping carts. The retention clip 122 may include hinge 129 that is configured to engage a bumper hinge pin or hinge point 123 as shown in FIG. 14B allowing the retention clip 122 to rotate or pivot from an open to a closed and locked configuration. Any of the bumpers and guards disclosed herein may be configured with a hinge pin 123 to engage retention clip 122. The retention clip 122 may also include fingers 124 and locking finger 126. The fingers 124 and locking finger 126 promote stiffness and support during bend cycles experienced during use. The distal end of locking finger 126 may include clip 128. Clip 128 may be configured to engage a projection 138 positioned opposite the hinge pin 123 on a bumper or guard disclosed herein. In the closed and locked configuration, the retention clip 122 is configured to prevent the bumper or guard from rotating or spinning out of position on the shopping cart 10. The bumper or guard may also include a raised boss 137. Raised boss 137 provides additional protection at points of abrasion to prolong the service life of the shopping cart 10.

Figure 15:
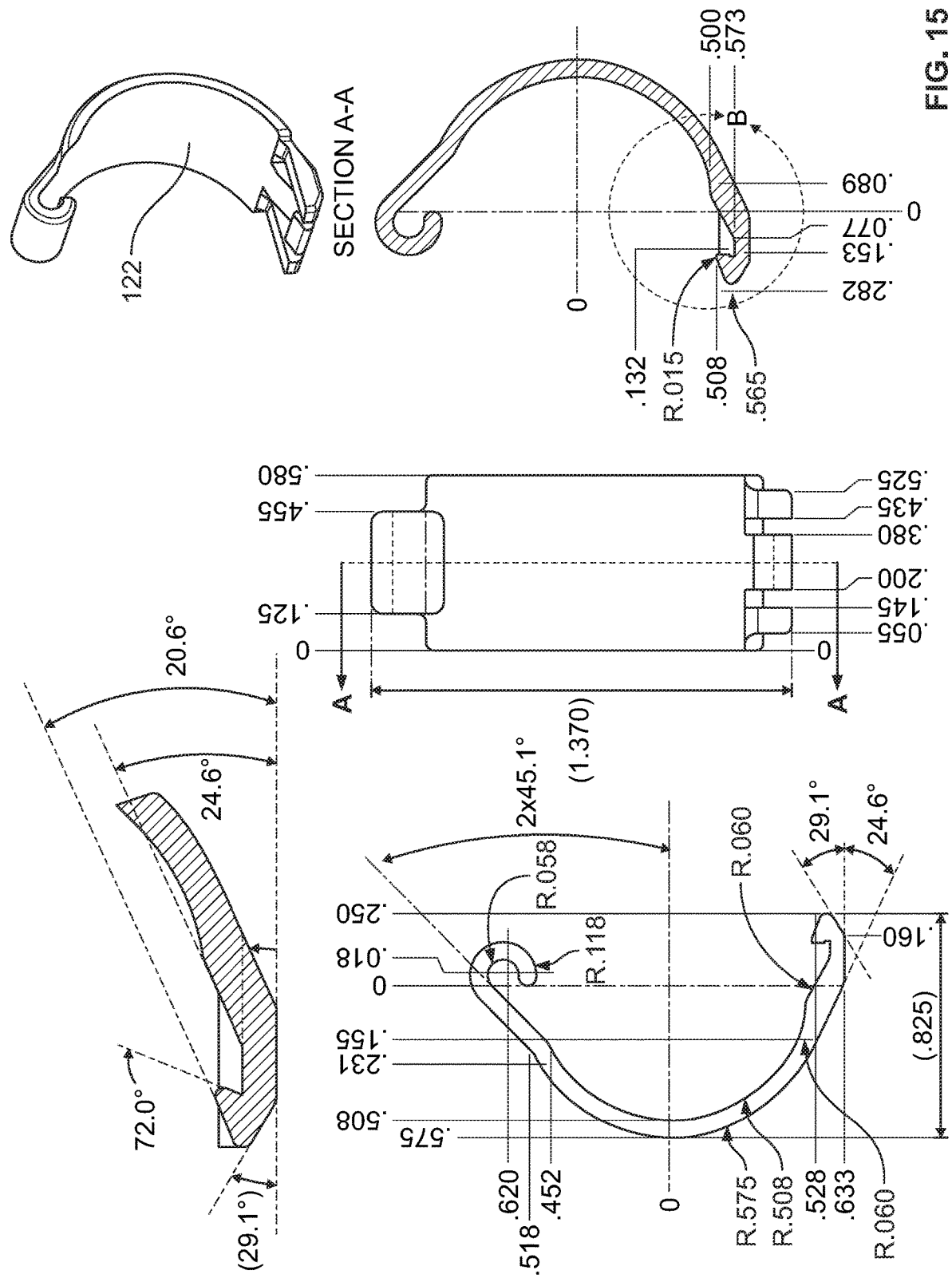
FIG. 15 is a specification schematic of a retention clip according to aspects of the present disclosure.

FIG. 15 is a specification schematic of the retention clip 122 disclosed herein. The configuration and related design specifications and characteristics of the retention clip 122 solves prior manufacturing problems and issues experienced with previous designs of other prior art retention devices. The disclosed retention clip 122 includes a substantially oval-shaped configuration that reduces deformation and associated changes to retention device diameters. The current configuration of retention clip 122 prevents deformation that results in the rotation and movement of abrasion bumpers and guards to provide enhanced shopping cart wear and abrasion protection. As disclosed above, the retention clip 122 prevents unwanted rotation and spinning of bumpers and guards.

While the invention has been described with respect to specific examples including presently preferred modes of carrying out the invention, those skilled in the art will appreciate that there are numerous variations and permutations of the above described systems and methods. In particular, any of the various components and features described herein can be used in combination with any other components and features, including alternate embodiments. Thus, the spirit and scope of the invention should be construed broadly as set forth in the appended claims.

We claim:

1. An abrasion resistant shopping cart comprising:
a frame;
a chassis portion;
a plurality of casters wherein the plurality of casters are mounted to the chassis;
a handle extending upward from the chassis portion;
a basket connected to the frame; and
at least one bumper, wherein the bumper includes at least one retention clip, wherein the bumper is configured to provide wear reduction, and wherein the bumper includes a hinge pin configured to engage a hinge on the retention clip, a first finger guide, a second finger guide, and a locking finger guide.

2. The shopping cart of claim 1, wherein the basket further includes a front wall, a rear gate, a plurality of side walls extending between the front wall and the rear gate, and a floor.

3. The shopping cart of claim 2, wherein the rear gate is configured as a swinging gate.

4. The shopping cart of claim 3, wherein the cart is configured to nest with a second cart.

5. The shopping cart of claim 4, wherein the cart further includes an integrated nest stop and caster lift guard configured to reduce damage to the cart from nesting.

6. The shopping cart of claim 1 wherein the at least one bumper is a frame nose bumper, a rear handle guard, or a forward handle guard.

7. The shopping cart of claim 1, wherein the retention clip further includes a first finger, a second finger, and a locking finger, wherein the retention clip pivotally rotates on the hinge pin, wherein the first finger and the second finger are configured to engage the first finger guide and the second finger guide, and wherein the locking finger is configured to releasably engage the locking finger guide.

8. The shopping cart of claim 7, wherein the retention clip further includes a clip on a tip of the locking finger configured to engage a projection in the locking finger guide.

9. The shopping cart of claim 1, wherein the at least one bumper is configured to engage either side of the cart, or configured to engage a bottom and a top of the cart.

10. The shopping cart of claim 1, further including a plurality of unified horn covers configured to engage the plurality of casters.

11. An abrasion resistant shopping cart comprising:
a frame;
a chassis portion;
a plurality of casters wherein the plurality of casters are mounted to the chassis;
a handle extending upward from the chassis portion;
a basket connected to the frame, wherein the basket further includes a front wall, a swinging rear gate, a plurality of side walls extending between the front wall and the rear gate, and a floor;
a gate nesting bumper configured to engage the rear gate; and
a universal cart bumper including at least one retention clip configured to secure the universal cart bumper to the cart.

12. The shopping cart of claim 11, wherein the cart is configured to nest with a second cart, and wherein the gate nesting bumper is further configured to reduce wear caused by the nesting of carts.

13. The shopping cart of claim 11, wherein the gate nesting bumper further includes a front piece, the front piece including a hollow portion, a back piece, a spacer, and an opening configured to permit attachment to the gate.

14. The shopping cart of claim 13, wherein the gate nesting bumper further includes a first socket and a second socket, wherein the first socket and the second socket are configured to engage a mechanical fastener, and wherein the gate nesting bumper is attached to the gate by the mechanical fastener.

15. The shopping cart of claim 11, wherein the cart bumper further includes a hinge pin configured to engage a hinge on the retention clip, a first finger guide, a second finger guide, and a locking finger guide.

16. The shopping cart of claim 15, wherein the retention clip further includes a first finger, a second finger, and a locking finger, wherein the retention clip pivotally rotates on the hinge pin, wherein the first finger and the second finger are configured to engage the first finger guide and the second finger guide, and wherein the locking finger is configured to releasably engage the locking finger guide.

17. The shopping cart of claim 16, wherein the retention clip further includes a clip on a tip of the locking finger configured to engage a projection in the locking finger guide.

18. The shopping cart of claim 11, wherein the universal cart bumper is configured to engage either side of the cart, or a bottom and a top of the cart.

19. An abrasion resistance guard for a shopping cart comprising:
a universal bumper configured to engage a left and right side of a shopping cart, or a bottom and a top of the shopping cart; and
a retention clip,
wherein the universal bumper further comprises:
a hinge pin configured to engage a hinge on the retention clip;
a first finger guide;
a second finger guide; and
a locking finger guide,
wherein the retention clip further comprises:
a first finger;
a second finger; and
a locking finger,
wherein the retention clip pivotally rotates on the hinge pin,
wherein the first finger and the second finger are configured to engage the first finger guide and the second finger guide,
wherein the locking finger is configured to engage the locking finger guide, and
wherein the retention clip further includes a clip on a tip of the locking finger configured to engage a projection in the locking finger guide.

* * * * *